(12) United States Patent
Kurita

(10) Patent No.: US 11,144,266 B2
(45) Date of Patent: Oct. 12, 2021

(54) PRINTING SYSTEM

(71) Applicant: Riso Kagaku Corporation, Tokyo (JP)

(72) Inventor: Shoji Kurita, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 16/990,327

(22) Filed: Aug. 11, 2020

(65) Prior Publication Data

US 2021/0064315 A1 Mar. 4, 2021

(30) Foreign Application Priority Data

Aug. 28, 2019 (JP) .............................. JP2019-155262
Aug. 28, 2019 (JP) .............................. JP2019-155263
Aug. 7, 2020 (JP) .............................. JP2020-134370

(51) Int. Cl.
*G06F 3/12* (2006.01)

(52) U.S. Cl.
CPC .......... *G06F 3/1261* (2013.01); *G06F 3/1204* (2013.01); *G06F 3/1254* (2013.01)

(58) Field of Classification Search
None
See application file for complete search history.

(56) References Cited

U.S. PATENT DOCUMENTS

| | | | | |
|---|---|---|---|---|
| 9,690,524 B2* | 6/2017 | Omura | .................. | G06F 3/1287 |
| 10,402,125 B2* | 9/2019 | Yamaguchi | ........ | H04N 1/00633 |
| 2011/0080614 A1* | 4/2011 | Sasaki | ..................... | G06K 15/00 |
| | | | | 358/1.18 |
| 2015/0301767 A1* | 10/2015 | Morita | .................. | G06F 3/1253 |
| | | | | 358/1.13 |
| 2017/0372179 A1* | 12/2017 | Isobe | .................. | G06K 15/1805 |
| 2018/0227459 A1* | 8/2018 | Nishijima | .......... | H04N 1/32112 |
| 2019/0004679 A1* | 1/2019 | Hirasawa | .............. | G06F 3/0483 |
| 2019/0384552 A1* | 12/2019 | Sakaguchi | ............ | G06F 3/1273 |
| 2020/0162627 A1* | 5/2020 | Utoh | .................. | H04N 1/00209 |

FOREIGN PATENT DOCUMENTS

| | | |
|---|---|---|
| JP | 2013-220607 A | 10/2013 |
| JP | 2015-143779 A | 8/2015 |

* cited by examiner

*Primary Examiner* — Fan Zhang
(74) *Attorney, Agent, or Firm* — Greenblum & Bernstein, P.L.C.

(57) ABSTRACT

A printing system includes: a first printing device, which has a first print processing unit that performs print processing and a first display unit that displays a setting input screen that receives a predetermined input of settings; a second printing device, which is provided on the downstream side of the first printing device, has a second print processing unit that performs print processing and a second display unit that displays a setting input screen that receives a predetermined input of settings; and a control unit that controls the first printing device and the second printing device. The control unit enables a setting to be input via the setting input screen of only one of first display unit and the second display unit in the case that input of settings having the same content is to be received by the first printing device and the second printing device.

10 Claims, 19 Drawing Sheets

FIRST PRINTING UNIT
(FIRST DISPLAY UNIT)

SECOND PRINTING UNIT
(SECOND DISPLAY UNIT)

FIRST PRINTING UNIT
(FIRST DISPLAY UNIT)

SECOND PRINTING UNIT
(SECOND DISPLAY UNIT)

FIRST PRINTING UNIT
(FIRST DISPLAY UNIT)

SECOND PRINTING UNIT
(SECOND DISPLAY UNIT)

FIRST PRINTING UNIT
(FIRST DISPLAY UNIT)

SECOND PRINTING UNIT
(SECOND DISPLAY UNIT)

PRINTING SYSTEM

CROSS-REFERENCE TO RELATED APPLICATIONS

The present application claims priority under 35 U.S.C. § 119 to Japanese Patent Application No. 2019-155262, filed on Aug. 28, 2019, Japanese Patent Application No. 2019-155263 filed on Aug. 28, 2019 and Japanese Patent Application No. 2020-134370, filed on Aug. 7, 2020. The above application is hereby expressly incorporated by reference, in its entirety, into the present application.

BACKGROUND OF THE INVENTION

1. Field of the Invention

The present invention is related to a printing system that includes a plurality of printing units.

2. Description of the Related Art

Conventionally, a printing system that includes a plurality of printing devices provided in series in a print medium conveyance direction has been proposed (refer to Japanese Unexamined Patent Publication No. 2013-220607, for example).

According to such a printing system, in the case that double sided printing is performed on a print medium, high speed print processing is possible and productivity can be improved compared to a conventional switchback type printing device.

SUMMARY OF THE INVENTION

Here, in a printing system in which a plurality of printing devices are connected as described above, an operation panel that receives various input of settings is provided for each printing device. In the case that settings are input using such an operation panel, for example, for setting items unique to each printing device, it is necessary to input settings on the operation panel of each printing device. However, it is inefficient to set setting items for which the same content is to be set for each of the printing devices on each operation panel. Further, in the case that different contents are set on each operation panel for such a setting item, regardless of which of the set contents are prioritized, it is not a desired setting for the user who has set contents which are different from the prioritized contents, and therefore confusion is caused.

Note that Japanese Unexamined Patent Publication No. 2015-143779 proposes that two operation panels, which are an operation panel provided on a printing device and an operation panel provided separate from the printing device, be employed in the case that various settings are input to one printing device. However, no method has been proposed for inputting various settings to a printing system in which a plurality of printing devices are connected as described above.

The present invention has been developed in view of the foregoing circumstances. It is an object of the present invention to improve the operability of a printing system in which a plurality of printing units are connected, and to provide a printing system which is capable of performing various input of settings without causing user confusion.

A printing system according to the present invention includes: a first printing unit, which has a first print processing unit that performs print processing on a print medium based on first print data and a first display unit that displays a setting input screen that receives a predetermined input of settings by a user; a second printing unit, which is provided on the downstream side of the first print unit in the conveyance direction of the print medium, has a second print processing unit that performs print processing on the print medium based on second print data, and has a second display unit that displays a setting input screen that receives a predetermined input of settings by the user; and a control unit that controls the first printing unit and the second printing unit; the control unit enabling a setting to be input via the setting input screen of only one of first display unit and the second display unit in the case that input of settings having the same content are to be received by the first printing unit and the second printing unit.

According to the printing system of the present invention, it is possible for a setting to be input via the setting input screen of either one of first printing unit and the second printing unit in the case that input of settings having the same content is to be received by the first printing unit and the second printing unit. Therefore, operability is improved, and it becomes possible to input various settings without causing user confusion.

DETAILED DESCRIPTION OF THE EMBODIMENTS

Figure 1:
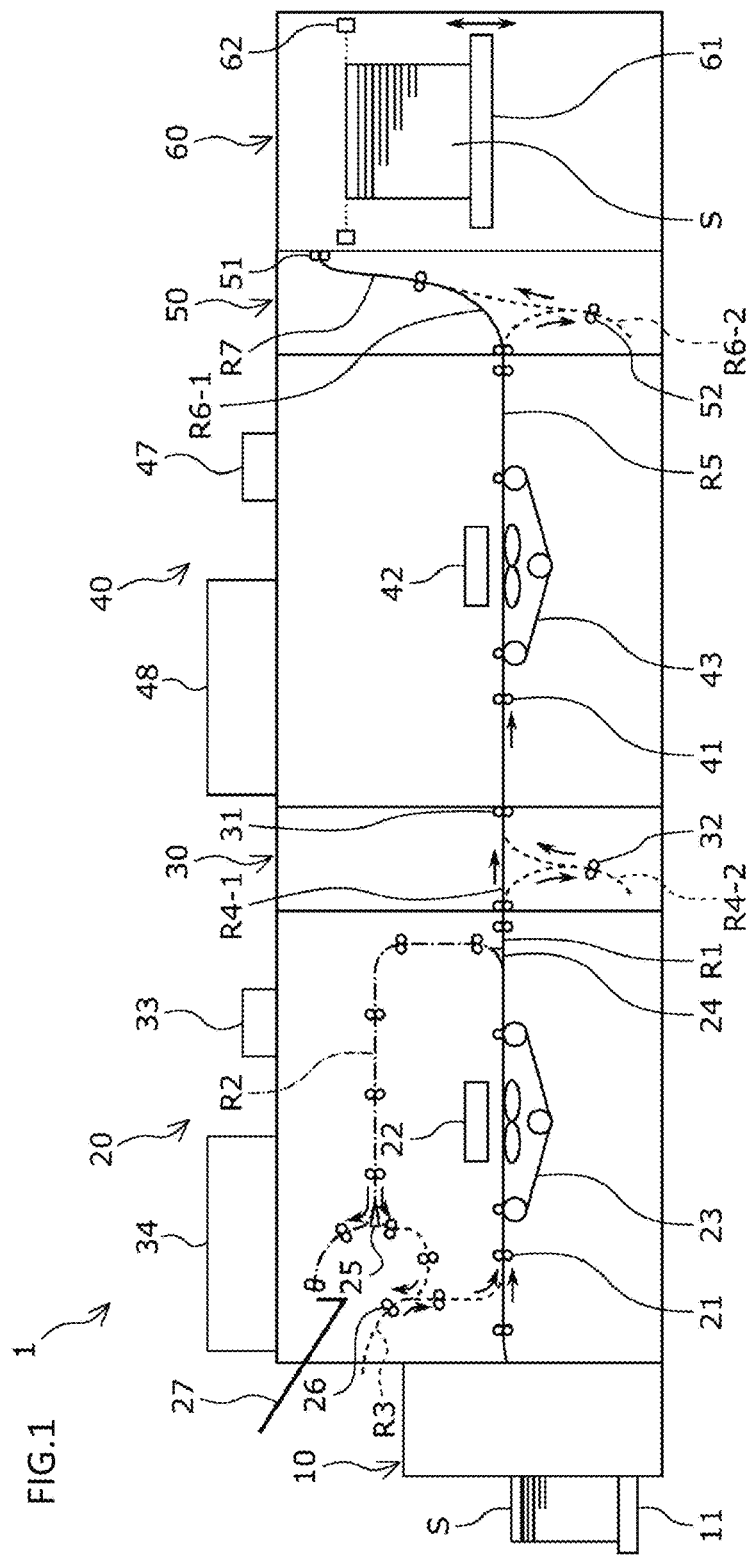
FIG. 1 is a diagram that illustrates the schematic configuration of an embodiment of a printing system of the present invention.
Figure 2:
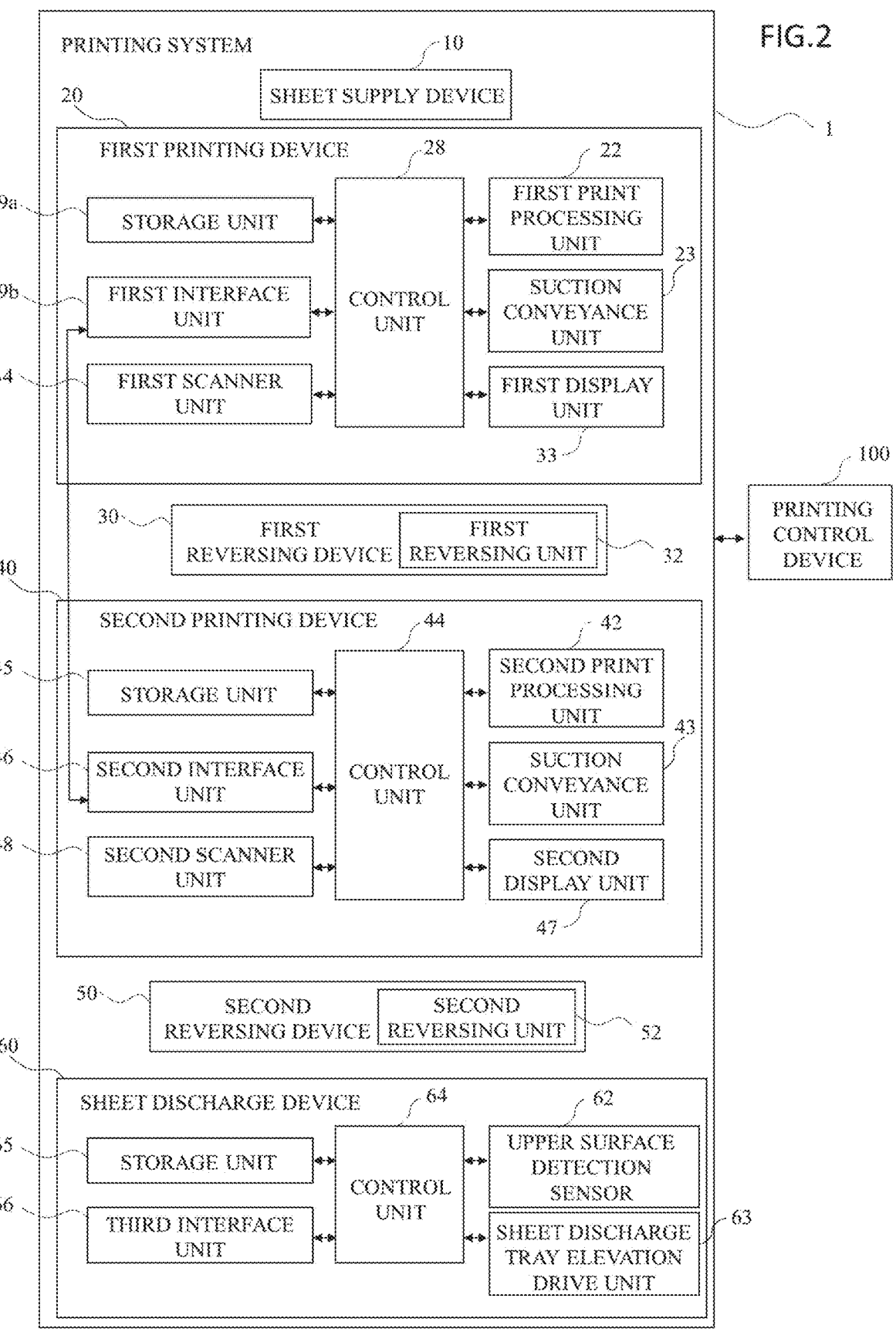
FIG. 2 is a block diagram that illustrates the schematic configuration of a control system of the printing system which is illustrated in FIG. 1.

Hereinafter, an embodiment of the printing system of the present invention will be described in detail with reference to the drawings. FIG. 1 is a diagram that illustrates the schematic configuration of an embodiment of a printing system 1 of the present invention. FIG. 2 is a block diagram that illustrates the schematic configuration of a control system of the printing system which is illustrated in FIG. 1.

As illustrated in FIG. 1, the printing system 1 according to the present embodiment includes a sheet supply device 10, a first printing device 20, a first reversing device 30, a second printing device 40, a second reversing device 50, and a sheet discharge device 60.

The printing system 1 receives first printing data for the first printing device 20 and second printing data for the second printing device 40 transmitted from a printing control device 100 (refer to FIG. 2) such as a personal computer that functions as a RIP controller. The first print data and the second print data are print jobs that include image data to be printed and print conditions.

The first print data is stored in a storage unit 29a of the first printing device 20 to be described later, and the second print data is stored in a storage unit 45 of the second printing device 40 to be described later. The first print data and the second print data are stored together with the job name of the print job, the user name of a user who sent the print job (owner name of the print job), etc. The first print data and the second print data are individually managed by a control unit 28 of the first printing device 20 and a control unit 44 of the second printing device 40, respectively.

The sheet supply device 10, the first printing device 20, the first reversing device 30, the second printing device 40, the second reversing device 50, and the sheet discharge device 60 are provided in series in a conveyance route of a print medium S (printing paper, for example). Note that at least two of the sheet supply device 10, the first printing device 20, the first reversing device 30, the second printing device 40, the second reversing device 50, and the sheet discharge device 60 may be integrally provided in a common housing. In addition, in the present embodiment, the sheet supply device 10, the first printing device 20, and the first reversing device 30 correspond to the first printing unit of the present invention, and the second printing device 40, the second reversing device 50, and the sheet discharge device 60 correspond to the second printing unit of the present invention.

In FIG. 1, linear conveyance routes R1, R4-1, R5, and R6-1, as well as the discharge route R7 of the print medium S are indicated by solid lines. A circulation conveyance route R2 is indicated by a chain line, and reverse conveyance routes R3, R4-2, and R6-2 are indicated by broken lines.

The sheet supply device 10 has a sheet supply tray 11, on which print media S is stacked prior to printing. Although not illustrated, the sheet supply device 10 includes a sheet supply roller for feeding out and conveying the uppermost print medium S among the plurality of print media S which are stacked on the sheet supply tray 11, and a sheet supply drive unit that drives this sheet supply roller and a sheet supply tray elevating unit that moves the sheet feed table 11 up and down. The supply drive unit and the sheet supply tray elevating unit are constituted by known actuators.

As illustrated in FIG. 1, the first printing device 20 includes a plurality of conveyance roller pairs 21, a first print processing unit 22, a suction conveyance unit 23, a first conveyance route switching unit 24, and a second conveyance route switching unit 25, a switchback roller pair 26, a sheet discharge table 27, a first display unit 33, and a first scanner unit 34. In addition, the first printing device 20 has a control unit 28, the storage unit 29a, and the first interface unit 29b, as illustrated in FIG. 2.

A plurality of conveyance roller pairs 21 are provided in the first printing device 20. The conveyance roller pairs 21 convey the print medium S while nipping it.

The first print processing unit 22 performs single sided or double sided printing on the print medium S based on the first print data which is received from the printing control device 100. The first print processing unit 22 performs print processing on the print medium S using basic ink colors such as CMYK, gray, etc. The first print processing unit 22 has, for example, a line head type inkjet head that ejects ink of each color. In the present embodiment, the inkjet method is adopted as the printing method of the first print processing unit 22, but the present invention is not limited to such a configuration, and the laser method or the stencil printing method may be adopted.

The suction conveyance unit 23 is provided such that it faces the first print processing unit 22. The suction conveyance unit 23 conveys the print medium S with a belt while suctioning the print medium S.

The first conveyance route switching unit 24 switches the conveyance route of the print medium S, which has been subjected to single sided printing by the first print processing unit 22, between the linear conveyance route R1 that continues to the first reversing device 30 and the circulation conveyance route R2 that continues to the sheet discharge table 27 and the reversed conveyance route R3. In the case that the first printing device 20 is to perform double sided printing, the first conveyance route switching unit 24 switches the conveyance route of the print medium S to the circulation conveyance route R2 after the single sided printing of the print medium S is completed. After the double sided printing of the print medium S is completed, the conveyance route of the print medium S is switched to the linear conveyance route R1 or to the circulation conveyance route R2 again such that the print medium S is discharged to the sheet discharge table 27.

The second conveyance route switching unit 25 switches the conveyance route that continues beyond the circulation conveyance route R2 of the print medium S between a conveyance route that continues to the sheet discharge table 27 and a conveyance path that continues to the reverse conveyance route R3 that reverses the front and back of the print medium S by the switchback roller pair 26. In the case that the first print processing unit 22 is to perform double sided printing, the second conveyance route switching unit 25 switches the circulation conveyance route R2 of the print medium S to the conveyance route that continues to the reverse conveyance route R3. Then, the print medium S whose front and back sides are reversed in the reverse conveyance route R3 is conveyed to the first print processing unit 22 again.

Print media S which are not to be discharged to the sheet discharge device 60 are stacked on the sheet discharge table 27.

As illustrated in FIG. 1, the first display unit 33 is provided on the upper portion of the first printing device 20, and is constituted by a touch panel which has a liquid crystal display, for example.

Figure 3A:
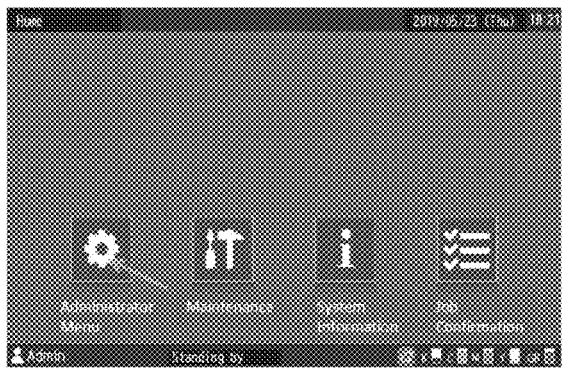
FIG. 3A is a diagram that illustrates a first example of a transition of a setting input screen on a first display unit and a second display unit.

The first display unit 33 displays a setting input screen that receives various inputs of settings from the user under control by the control unit 28. The first display unit 33 of the present embodiment displays setting input screens in a hierarchical manner. The first display unit 33 displays a home screen as a setting input screen of the first hierarchical level, which is the highest level, for example. Specifically, the first display unit 33 displays, as a home screen, setting items such as an administrator menu, maintenance, system information, and job confirmation, as illustrated in FIG. 3A.

The administrator menu is a setting item that accepts various input of settings from an administrator, maintenance is an item that displays information related to maintenance of the first printing unit (for example, the remaining amount of consumables such as ink and print media and the number of sheets on which printing has been performed since a previous cleaning operation), the job confirmation is a setting item for displaying the status of the first print data (print job) which is received by the first printing device 20, and accepts editing of a list of the first print data. In addition, the system information is an item for displaying information related to the system of the first printing unit.

In the case that any one of the administrator menu, maintenance, system information, and job confirmation items is selected on the home screen, the first display unit 33 displays information related to the selected item as a second hierarchical level setting input screen. As a method for hierarchical display, the home screen may be switched to the setting input screen of the second hierarchical level, or a new window of the setting input screen of the second hierarchical level may be overlaid and displayed on the home screen.

In the present embodiment, when the setting input screen of the second hierarchical level is displayed by the first display unit 33, in the case that the contents of settings to be input to the first printing unit and the second printing unit are the same, input of settings is enabled only on the setting input screen of the first display unit 33, and input of settings is disabled on the setting input screen of a second display unit 47. In the case that unique contents are to be input to the first printing unit or the second printing unit, input of settings is enabled on both the setting input screens of the first display unit 33 and the second display unit 47. The transition of the hierarchical display from the home screen will be described in detail later.

A document is placed on the first scanner unit 34, and the document is photoelectrically read to generate image data. The image data which is generated by the first scanner unit 34 is obtained by the control unit 28, and the control unit 28 generates the first print data (print job) based on the acquired image data and stores it in the storage unit 29a to manage it.

The control unit 28 has a processor (for example, a CPU: Central Processing Unit) that functions as an arithmetic processing unit and controls the operation of each component of the sheet supply device 10, the first printing device 20, and the first reversing device 30.

The printing system 1 of the present embodiment has the control unit 28 of the first printing device 20, the control unit 44 of the second printing device 40 to be described later, a control unit 64 of the sheet discharge device 60 to be described later, etc. These control units may be collectively or individually referred to as the control unit of the printing system 1. Note that the printing system 1 may be equipped with a control unit that performs the processes of at least two of the control unit 28 of the first printing device 20, the control unit 44 of the second printing device 40, the control unit 64 of the sheet discharge device 60, etc. In addition, the processes of the control unit of the present invention may be performed by the control unit 28 and the control unit 44 cooperating with each other. Alternatively, the processes may be performed by one of the control unit 28 and the control unit 44. As a further alternative, a control unit other than the control units 28, 44, and 64 may be provided, and this control unit may perform the processes.

The storage unit 29a is equipped with a ROM (Read Only Memory), which is a read only semiconductor memory in which a predetermined control program is recorded in advance, and a RAM (Random Access Memory), which is a semiconductor memory capable of being utilized as a work storage area for writing and reading as necessary when a processor executes various control programs. The storage unit 29a is also equipped with a storage such as a hard disk that stores the first print data (print job) which is received by the first printing device 20.

The first interface unit 29b sends and receives various pieces of information such as the first print data between the first printing device 20 and the printing control device 100, as well as between the first printing device 20 and each component of the printing system 1.

Particularly, the first interface unit 29b of the present embodiment communicates with a second interface unit 46 of the second printing device 40, and sends specific setting input information which is input and set on the first display unit 33 of the first printing device 20 to the second interface unit 46. In addition, the first interface unit 29b receives specific setting input information which is input and set on the second display unit 47 of the second printing device 40 and is sent from the second interface unit 46.

In the present embodiment, the specific setting input information which is sent and received between the first interface unit 29b and the second interface unit 46 is the setting input information having the same content for the first printing unit and the second printing unit. The setting input information having same content and the timings at which the setting input information is sent and received will be described in detail later.

Next, the first reversing device 30 is provided downstream of the first printing device 20 in the conveyance direction of the print medium S, as illustrated in FIG. 1. The first reversing device 30 has a plurality of conveyance roller pairs 31 and a first reversing unit 32. The conveyance roller pairs 31 convey the print medium S which is discharged from the first printing device 20 while nipping the print medium S.

The first reversing device 30 is equipped with a conveyance route switching mechanism (not illustrated). The conveyance route switching mechanism switches the conveyance route of the print medium S between the linear conveyance route R4-1 that conveys the print medium S which is discharged from the first printing device 20 to the second printing device 40, and a reversed conveyance route R4-2 that reverses the front and back surfaces of the print medium S. The first reversing unit 32 is provided on the reversed conveyance route R4-2. The first reversing unit 32 has a switchback roller pair and a reversing drive unit that drives the switchback roller pair. The reversing drive unit is constituted by a known actuator.

The first reversing device 30 is controlled by the control unit 28, and switches between the linear conveyance route R4-1 and the reversed conveyance route R4-2 according to whether a printing process is to be administered on the front surface and the back surface of the print medium S.

Next, the second printing device 40 is provided downstream of the first reversing unit 32 in the conveyance direction of the print medium S, as illustrated in FIG. 1. The second printing device 40 has a plurality of conveyance roller pairs 41, a second print processing unit 42, a suction conveyance unit 43, the second display unit 47, and a second scanner unit 48. In addition, the second printing device 40 has the control unit 44, the storage unit 45, and the second interface unit 46, as illustrated in FIG. 2.

The plurality of conveyance rollers pairs 41 are provided in the second printing device 40 and convey the print medium S while nipping it.

The second print processing unit 42 performs single sided printing on the back surface of the print medium S of which printing has been administered on the front surface and has been conveyed from the first printing device 20, based on the second print data which is received from the printing control device 100, for example. The second print processing unit 42 performs print processing on the print medium S employing basic ink colors such as CMYK, gray, etc. Thereby, it is not necessary to provide a recirculation route in the first printing device 20 to convey the print medium S, for example, compared to a case in which double sided printing is performed only by the first printing device 20. Therefore, productivity can be improved.

Note that the second print processing unit 42 may perform printing on the print medium S using a magnetic ink such as MICR ink. The second print processing unit 42 may print on the print medium S using a special ink colors such as a transparent ink color other than the basic ink colors, UV ink, etc. The ink, such as the magnetic ink which is employed by the second print processing unit 42 is an example of an ink of a different type from the ink used in the first print processing unit 22 (basic ink colors such as CMYK). In the case that the ink which is employed for printing by the second print processing unit 42 is a magnetic ink, it is preferable for a mechanism for stirring the ink in order to suppress sedimentation of the components thereof to be provided.

The second print processing unit 42 has a line head type inkjet head. Note that in the present embodiment, the inkjet method is adopted as the printing method of the second print processing unit 42. However, the present invention is not limited to such a configuration, and a laser method or a stencil printing method may be adopted.

The second print processing unit 42 prints on one side of the print medium S on which single sided printing has been administered and is conveyed from the first printing device 20, for example. The second print processing unit 42 may print on either surface of the print medium S, and whether the surface to be printed is the front surface or the back surface may be controlled by the reversing process of the first reversing device 30.

The suction conveyance unit 43 is provided such that it faces the second print processing unit 42. The suction conveyance unit 43 conveys the print medium S with a belt while suctioning the print medium S.

The second printing device 40 also has the first conveyance route switching unit 24, the second guiding path switching unit 25, the switchback roller pair 26, a sheet discharge table 27, etc., in the same manner as the first printing device 20, and may be capable of performing double sided printing on the medium S.

The second display unit 47 is provided on the upper portion of the second printing device 40 as illustrated in FIG. 1, and is constituted by, for example, a touch panel having a liquid crystal display.

The second display unit 47 displays a setting input screen that receives various inputs of settings by the user under control of the control unit 44. The second display unit 47 of the present embodiment displays a setting input screen in a hierarchical manner, in the same manner as the first display unit 33. The second display unit 47 displays a home screen as a setting input screen of the first hierarchical level, which is the highest level, in the same manner as the first display unit 33. Specifically, the second display unit 47 displays the same home screen as the first display unit 33. That is, the second display unit 47 also displays setting items such as an administrator menu, maintenance, system information, and job confirmation.

In the case that any one of the administrator menu, maintenance, system information, and job confirmation items is selected on the home screen, the second display unit 47 displays information related to the selected item as a second hierarchical level setting input screen. As a method of hierarchical display, the home screen may be switched to the setting input screen of the second hierarchical level, or a new window of the setting input screen of the second hierarchical level may be overlaid and displayed on the home screen.

Further, in the present embodiment, when the setting input screen of the second hierarchical level is displayed by the second display unit 47, in the case that the contents of settings to be input to the first printing unit and the second printing unit are the same, input of settings is enabled only on the setting input screen of the second display unit 47, and input of settings is disabled on the setting input screen of the first display unit 33. In the case that unique contents are to be input to the first printing unit or the second printing unit, input of settings is enabled on both the setting input screens of the first display unit 33 and the second display unit 47. Note that the transition of the hierarchical display from the home screen will be described in detail later.

A document is placed on the second scanner unit 48, and the document is photoelectrically read to generate image data. The image data which is generated by the second scanner unit 48 is obtained by the control unit 44, and the control unit 44 generates the second print data (print job) based on the acquired image data and stores it in the storage unit 45 to manage it.

The control unit 44 has a processor (for example, a CPU) that functions as an arithmetic processing unit, and controls the operation of each component of the second printing device 40 and the second reversing device 50.

The storage unit 45 is a ROM, which is a read only semiconductor memory in which a predetermined control program is recorded in advance, a RAM, which is a semiconductor memory capable of being utilized as a work storage area for writing and reading as necessary when a processor executes various control programs, or the like. The storage unit 45 is also equipped with a storage such as a hard disk that stores the second print data (print job) which is received by the second printing device 40.

The second interface unit 46 sends and receives various pieces of information such as the second print data between the second printing device 40 and the printing control device 100, as well as between the second printing device 40 and each component of the printing system 1.

Particularly, the second interface unit 46 of the present embodiment communicates with the first interface unit 29*b* of the first printing device 20 as described above, and sends specific setting input information which is input and set on the second display unit 47 of the second printing device 40 to the first interface unit 29*b*. In addition, the second interface unit 46 receives specific setting input information which is input and set on the first display unit 33 of the first printing device 20 and is sent from the first interface unit 29*b*.

The second reversing device 50 is provided downstream of the second printing device 40 in the conveyance direction of the print medium S. As illustrated in FIG. 1, the second reversing device 50 has a plurality of conveyance roller pairs 51 and a second reversing unit 52. The conveyance roller pairs 51 convey the print medium S which is discharged from the second printing device 40 while nipping the print medium S.

The second reversing device 50 is equipped with a conveyance route switching mechanism (not illustrated). The conveyance route switching mechanism switches the conveyance route of the print medium S between the linear conveyance route R6-1 that conveys the print medium S which is discharged from the first printing device 20 to the sheet discharge device 60, and the reversed conveyance route R6-2 that reverses the front and back surfaces of the print medium S. The second reversing unit 52 is provided on the reversed conveyance route R6-2. The second reversing unit 52 has a switchback roller pair and a reversing drive unit that drives the switchback roller pair. The reversing drive unit is constituted by a known actuator.

The second reversing device 50 is controlled by the control unit 44, and switches between the linear conveyance route R6-1 and the reverse conveyance route R6-2 as appropriate depending on whether the print medium S which has undergone the print processing is to be discharged face up or face down.

Next, the sheet discharge device 60 has a sheet discharge tray 61, an upper surface detection sensor 62, and a sheet discharge tray elevation drive unit 63 (refer to FIG. 2).

The print media S which are discharged from the second reversing device 50, that is, the print media S which have undergone print processing, are sequentially stacked on the sheet discharge tray 61. The sheet discharge tray 61 is moved up and down by driving the sheet ejection tray elevation drive unit 63. The sheet discharge table 61 may be a sheet discharge table that has a conveyor such as a belt conveyor or a roller conveyor on which the print media S are stacked.

The upper surface detection sensor 62 is a sensor for detecting the height of the stacking surface of the sheet discharge tray 61, that is, the height of the uppermost print medium S (the height of the upper surface of the sheet discharge tray 61 in the case that the print media S are not stacked). The upper surface detection sensor 62 has, for example, a light emitting unit that emits light horizontally (indicated by the dotted line in FIG. 1) at a height which is a desired stacking surface, and a light receiving unit that receives this light. In the case that the light emitted from the light emitting unit of the upper surface detection sensor 62 is blocked by the print media S and the light receiving unit of the upper surface detection sensor 62 does not receive the light, the control unit 64, which will be described later, controls the sheet discharge tray elevation drive unit 63 to lower the sheet discharge tray 61 for an amount corresponding to the height of the number of print media S.

The sheet discharge tray elevation drive unit 63 raises and lowers the sheet discharge tray 61. The sheet discharge tray elevation drive unit 63 is an actuator such as a motor.

The control unit 64 has a processor (for example, a CPU) that functions as an arithmetic processing unit, and controls the operation of each component of the sheet discharge device 60.

The storage unit 65 is a ROM, which is a read only semiconductor memory in which a predetermined control program is recorded in advance, a RAM, which is a semiconductor memory capable of being utilized as a work storage area for writing and reading as necessary when a processor executes various control programs, or the like, for example.

A third interface unit 66 sends and receives various types of information between the printing control apparatus 100, each component of the printing system 1, etc.

Next, an example of a transition of the setting input screens of the first display unit 33 and the second display unit 47 of the printing system 1 of the present embodiment will be described with reference to FIGS. 3 to 6. First, a first example which is illustrated in FIG. 3 will be described.

Figure 3B:
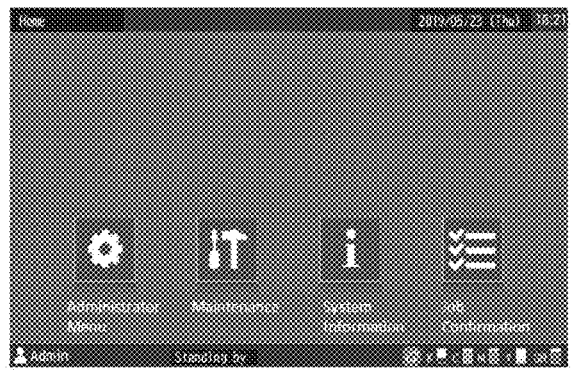
FIG. 3B is a diagram that illustrates a first example of a transition of a setting input screen on a first display unit and a second display unit.

In a state immediately after the power of the printing system 1 is turned ON, the home screen is displayed on both the first display unit 33 and the second display unit 47 as illustrated in FIGS. 3A and 3B.

Figure 3C:
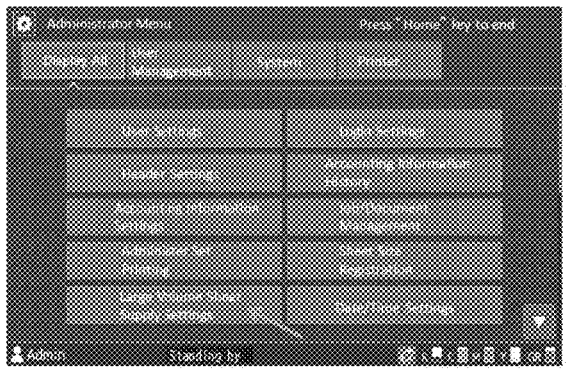
FIG. 3C is a diagram that illustrates a first example of a transition of a setting input screen on a first display unit and a second display unit.
Figure 3D:
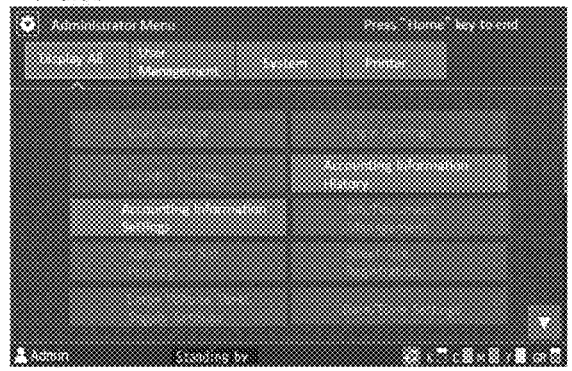
FIG. 3D is a diagram that illustrates a first example of a transition of a setting input screen on a first display unit and a second display unit.

Next, in the case that any of the items on the home screen of the first display unit 33 is selected, the screen corresponding to that item is displayed as a second hierarchical level screen. FIG. 3C illustrates an example of a second hierarchical level setting input screen which is displayed on the first display unit 33, and FIG. 3D illustrates an example of a second hierarchical level setting input screen which is displayed on the second display unit 47 in the case that the administrator menu is selected on the first display unit 33.

In the case that the administrator menu item is selected, the first display unit 33 displays all of a plurality of setting items which are set in advance as an administrator menu. The setting items of the administrator menu include, for example, user settings, login settings, header settings, accounting information history, accounting information settings, Job/Document management, administrator set printing, sheet size registration, large volume sheet supply settings, date and time settings, specific ink settings, supply stock management, print area switching, cleaning cycle settings, envelope sheet supply settings, linked sheet discharge unit settings, and inspection device position adjustment. However, the setting items of the administrator menu are not limited to these, and other items may be included.

The user settings are a setting item for registering a user who uses the printing system 1. In the user settings, the user's ID and password are set and registered. A login screen is displayed on the first display unit 33 of the first printing device 20, and input of settings on the first display unit 33 is enabled only in the case that the user name and password registered by the user are input and set on the login screen. In addition, in the user settings, the use of a color mode and the number of copies may be restricted for each user.

The login settings are an item that accepts input of settings as to whether login is required when entering each of a print mode, a copy mode, and a scan mode.

The header settings arranges the user names which are registered by users in alphabetical order, and displays the user names are displayed in groups such as an "A" row, a "B" row, and a "C" row. The header settings are an item that accepts an input of settings to delete display of a row in which no corresponding user exists at all or to display the rows arranged in descending order of the numbers of corresponding users, for example.

The accounting information history is an item that accepts an input of settings to delete an accounting information history file or to save an accounting information history file in a USB (Universal Serial Bus) memory. Although not illustrated, the first printing device 20 has a connection port to which a USB memory is connected. The accounting information is a history of print jobs which have been processed by the printing system 1. The accounting information records the completion status, the owner name, the processing time, the total number of pages, the number of copies, the processing start date and time of the print job, etc. of all print jobs.

The accounting information settings are an item that accepts an input of settings regarding whether to automatically delete the aforementioned accounting information after a predetermined period of time elapses.

The Job/Document management is an item that accepts an input of settings to confirm the details of all of the print jobs which are received by the printing system 1 or to delete the details of all of the print jobs which are received by the printing system 1. In the case that the Job/Document management item is selected, the job name, the document name, the saved folder name, the owner name, the number of copies, the completion time the reception time, the processing result, etc. of the print jobs are displayed as a list.

The administrator setting print is an item that accepts an input of settings to print a list of set values in the administrator menu.

The sheet size registration is an item that accepts an input of settings of irregular sheet sizes.

The large volume sheet supply settings are an item that accepts a input of settings of the position of the sheet supply tray 11 in the case that the print media S are depleted or to determine the position at which the sheet supply tray will be arranged in the case that a sheet supply tray up/down button (not illustrated) is pressed. In the present embodiment, three positions are set in advance, and any one of the three positions is selected in the input of settings of the large volume sheet supply settings.

The date/time settings are an item that accepts input of settings of the date and time.

The specific ink settings are an item that accepts an input of settings regarding prohibition or permission for each color in the case that ink that does not satisfy specific conditions, such as ink which has an expiration date within 6 months, is to be utilized.

The supply stock management is an item that counts the number of ink cartridges in stock and displays a confirmation message in the case that the number of stocks is low. In the supply stock management, ON/OFF of the confirmation message, the number of purchased ink cartridges and the number of ink cartridges in stock for each color, and a threshold value of the number of ink cartridges in stock for displaying the confirmation message are input and set.

The print area switching is an item that sets an area that masks an area around the sheet (causing a printed image to become a white image) during printing. For example, two types of areas "standard" and "maximum" are set, and one of the areas is selectively set by the user.

The cleaning cycle settings are an item for setting a cleaning cycle. In the cleaning cycle settings, the number of printed sheets at which cleaning is performed for each predetermined number of printed sheets is input and set.

The envelope sheet supply settings are an item that sets a head gap in the case that envelopes are to be printed. For example, the two types "prioritize image quality" and "prioritize sheet passage" are set, and one of these two is selectively set by the user. In the case that "prioritize image quality" is set, the head gap is set to be narrower than that in the case that "prioritize sheet passage" is set.

The linked sheet discharge unit settings are an item for setting the lowered position of the sheet discharge tray 61 when a print job is completed.

The inspection device position adjustment is an item for setting the position of an inspection device which is included in the first scanner unit 34 or the second scanner unit 48. The inspection device is a device that reads a barcode or the like which is printed on printing paper.

In the case that the administrator menu which is displayed on the first display unit 33 is selected, the first display unit 33 displays all of the setting items of the administrator menu as described above, and enables the selection of these setting items and input of settings.

Meanwhile, at this time, a control signal is output from the control unit 28 of the first printing device 20 to the control unit 44 of the second printing device 40. Then, the control unit 44 of the second printing device 40 causes the setting input screen of the second display unit 47 of the second printing device 40 to display only a portion of the setting items, for which settings unique to the second printing unit are to be set (hereinafter, also abbreviated as "unique setting items"), from among all of the setting items of the administrator menu, such that input of settings is enabled for these items.

Then, the control unit 44 causes setting items which have the same content for the first printing unit and the second printing unit (hereinafter, also abbreviated as "common content setting items") to be displayed on the setting input screen of the second display unit 47 in a grayed out manner, and disables input of settings for these items with respect to items which are displayed by the first display unit 33 such that input of settings is enabled. In this manner, a portion of the setting items are grayed out and the input of settings is disabled on the setting input screen of the second display unit 47. Thereby, different contents being set on the first display unit 33 and the second display 47 for the grayed out portion of the setting items can be prevented.

Note that common content setting items may be displayed such that input of settings is enabled only on the first display unit 33 between the first display unit 33 and the second display unit 47, and the common content setting items may be displayed in a grayed out manner on the second display unite 47 as in the example illustrated in FIG. 3. However, the present invention is not limited to such a configuration. The common content setting items may initially be displayed on both the first display unit 33 and the second display unit 47. In the case that a common content setting item is selected on one of the display units, input of settings for the common content setting item may be disabled by displaying a message screen such as "Operations being conducted at the other printing unit" on the other display unit.

Note that the portion of the setting items which have content unique to the second printing unit and setting items for which the same contents are set for the first printing unit and the second printing unit are set by the user as appropriate.

Among the setting items of the administrator menu described above, the setting items for which the same contents are set for the first printing unit and the second printing unit are user settings, login settings, header settings, administrator set printing, sheet size registration, large volume sheet supply settings, Job/Document management, print area switching, linked sheet discharge unit settings, inspection device position adjustment, date and time settings, etc. For these items, the contents which are input and set on either the first display unit 33 or the second display unit 47 may be commonly utilized by the first printing unit and the second printing unit. These are items for which it is not necessary to perform input and setting on both the first display unit 33 and the second display unit 47.

Meanwhile, among the setting items of the administrator menu, the setting items which have unique contents to be set for the second printing unit include accounting information history, accounting information settings, specific ink settings, supply stock management, cleaning cycle settings, and envelope sheet supply settings.

The accounting information history and the accounting information settings are setting items related to accounting information. The accounting information includes information which is unique to the first printing unit or the second printing unit, such as the completion status of print jobs that includes the passage status of print media S (sheet passed or sheet not yet passed) in the first printing unit or the second printing unit, and the processing time of the first printing unit or the second printing unit.

Therefore, regarding the two items described above related to the accounting information, unique contents are displayed on the first display unit 33 of the first printing device 20 and the second display unit 47 of the second printing device 40, and unique contents are input and set.

In addition, regarding the item of the specific ink settings as well, ink containers that contain the inks of each color are separately loaded in the first printing device 20 and the second printing device 40. Therefore, it is preferable for input of settings to be independently received by the first display unit 33 of the first printing device 20 and the second display unit 47 of the second printing device 40.

In addition, it is preferable for the supply stock management, the cleaning cycle settings, and the envelope sheet supply settings to be managed separately at the first printing device 20 and the second printing device 40. Therefore, it is preferable for input of settings to be independently received by the first display unit 33 of the first printing device 20 and the second display unit 47 of the second printing device 40.

Note that setting items are present in the administrator menu other than the setting items illustrated in FIGS. 3C and 3D. These other setting items can be viewed by pressing the scroll button which is displayed as a triangle in the lower right corner of the setting input screens of FIGS. 3C and 3D. When the scroll button is pressed, the screen scrolls to enable these other setting items to be viewed.

Figure 3E:
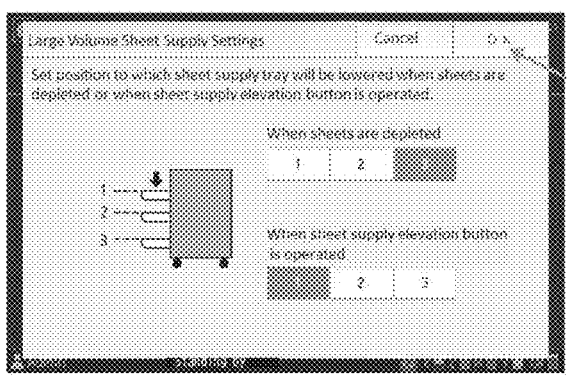
FIG. 3E is a diagram that illustrates a first example of a transition of a setting input screen on a first display unit and a second display unit.

Then, in the case that the large volume sheet supply setting, which is a common content setting item, is selected in the second hierarchical level setting input screen of the first display unit 33, for example, the setting input screen of a third hierarchical level a screen such as that which is illustrated in FIG. 3E is displayed on the first display unit 33. In the setting input screen illustrated in FIG. 3E, buttons that read "1", "2", and "3" for designating the position where the sheet supply tray 11 is to be arranged in the case that the print medium S is exhausted are displayed arranged side by side. In addition, the buttons that read "1", "2", and "3" for designating the position where the sheet supply tray 11 is to be arranged are displayed arranged side by side in the case that a sheet supply tray up/down button (not illustrated) is pressed.

The user sets and inputs the position of the sheet supply tray 11 by touching and selecting any one of the buttons that read "1", "2", and "3".

Figure 3F:
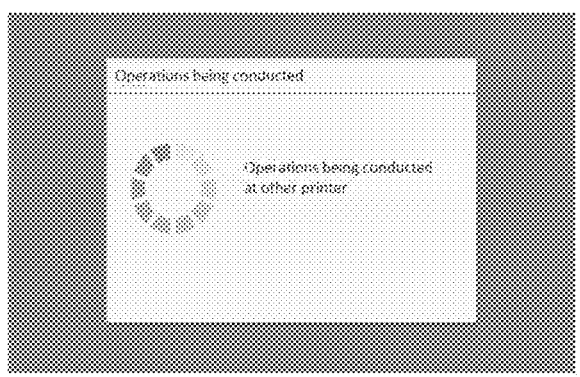
FIG. 3F is a diagram that illustrates a first example of a transition of a setting input screen on a first display unit and a second display unit.

Meanwhile, while the setting input screen of the third hierarchical level is being displayed on the first display unit 33 and the input of settings of the position of the sheet supply tray 11 is being performed, the second display unit 47 displays a screen that indicates that operations are being conducted at the first printing unit ("Operations being conducted at the other printer") as illustrated in FIG. 3F. By performing such a display, it is possible to notify a user who attempts to input a setting on the second display unit 47 that an operation to input settings is disabled. As a result, it is possible for useless operations or inconsistent settings to be prevented.

Figure 3G:
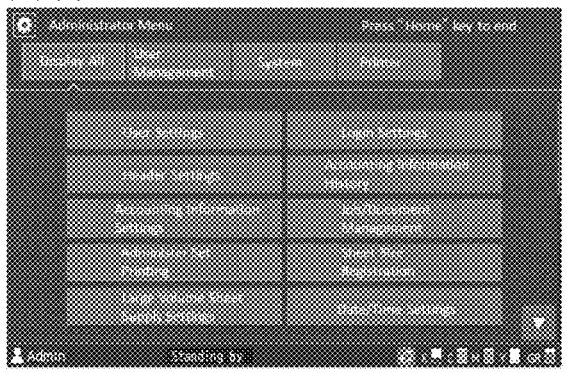
FIG. 3G is a diagram that illustrates a first example of a transition of a setting input screen on a first display unit and a second display unit.
Figure 3H:
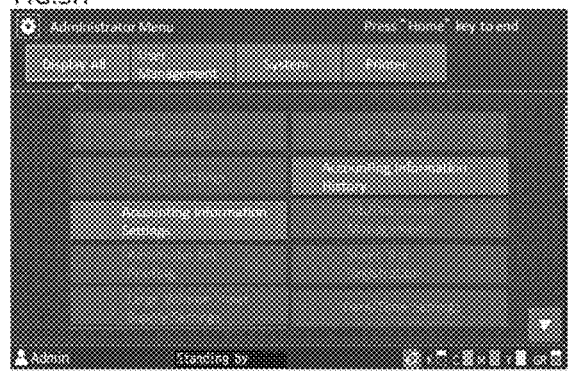
FIG. 3H is a diagram that illustrates a first example of a transition of a setting input screen on a first display unit and a second display unit.

Then, in the case that the user completes the input of settings for the position of the sheet supply tray 11, the user touches an "OK" button on the setting input screen of the third hierarchical level of the first display unit 33. In the case that the "OK" button is touched, both of the first display unit 33 and the second display unit 47 switch to display of the setting input screen of the immediately preceding second hierarchical level, as illustrated in FIGS. 3G and 3H.

In addition, in the case that the "OK" button on the setting input screen of the third hierarchical level of the first display unit 33 is touched, that is, in the case that an instruction to confirm the contents of settings is input, the control unit 28 causes the first interface unit 29b to send the setting input information related to the large volume sheet feed settings to the second printing device 40. The setting input information related to the large volume sheet supply settings which is sent from the first printing device 20 to the second printing device 40 is received by the second interface unit 46 of the second printing device 40, is stored and updated in the storage unit 45, and managed by the control unit 44.

By sending the setting input information related to the large volume sheet supply settings which is set and input at the first printing device 20 to the second printing device 40, and storing it in the second printing device 40 in this manner, the setting input information related to the large volume sheet supply settings can be shared with the second printing device 40. Accordingly, when the second printing device 40 confirms the large volume sheet feed settings, for example, it is possible to present the current setting input information of the first printing device 20.

In addition, in the case that the setting input information related to the large volume sheet supply settings is sent from the first printing device 20 to the second printing device 40 as described above, it is preferable for information related to other unchanged setting items in the administrator menu to not be sent, and for only information related to the large volume sheet supply settings which are changed in the third hierarchical level from the first printing device 20 to be sent to the second printing device 40. Thereby, the amount of data to be sent can be reduced and the data can be sent at high speed. As a result, the storage process can be performed at high speed in the second printing device 40, which is on the receiving side.

Next, a second example which is illustrated in FIG. 4 will be described. In the second example as well, immediately after the power of the printing system 1 is turned ON, the home screen is displayed on both of the first display unit 33 and the second display unit 47, as illustrated in FIGS. 4A and 4B.

Figure 4A:
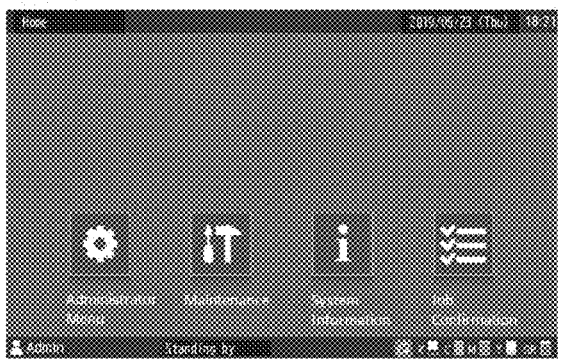
FIG. 4A is a diagram that illustrates a second example of the transition of the setting input screen on the first display unit and the second display unit.
Figure 4B:
FIG. 4B is a diagram that illustrates a second example of the transition of the setting input screen on the first display unit and the second display unit.
Figure 4C:
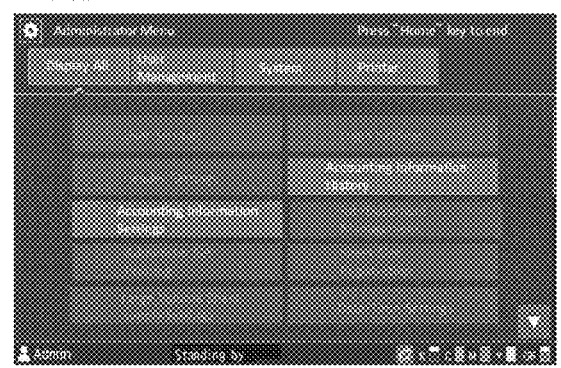
FIG. 4C is a diagram that illustrates a second example of the transition of the setting input screen on the first display unit and the second display unit.
Figure 4D:
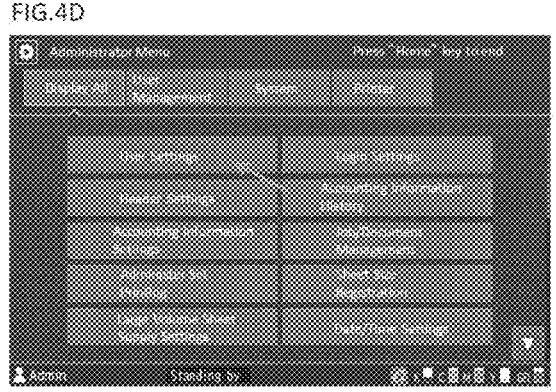
FIG. 4D is a diagram that illustrates a second example of the transition of the setting input screen on the first display unit and the second display unit.

Next, in the case that the administrator menu is selected on the home screen of the second display unit 47, the second display unit 47 displays all of the setting items of the administrator menu, and enables selection and input of settings for these setting items, as illustrated in FIG. 4D.

Meanwhile, at this time, a control signal is output from the control unit 44 of the second printing device 40 to the control unit 28 of the first printing device 20. Then, the control unit 28 of the first printing device 20 causes the setting input screen of the first display unit 33 of the first printing device 20 to display only a portion of the setting items, for which settings unique to the first printing unit are to be set, from among all of the setting items of the administrator menu, such that input of settings is enabled for these items. Next, the control unit 28 causes setting items which have the same content for the first printing unit and the second printing unit to be displayed on the setting input screen of the first display unit 33 in a grayed out display, and disables input of settings for these items.

Figure 4E:
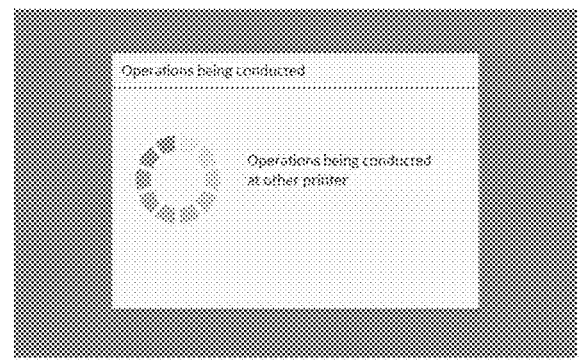
FIG. 4E is a diagram that illustrates a second example of the transition of the setting input screen on the first display unit and the second display unit.
Figure 4F:
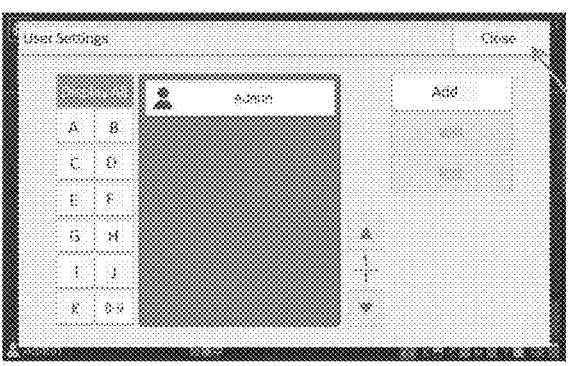
FIG. 4F is a diagram that illustrates a second example of the transition of the setting input screen on the first display unit and the second display unit.

Next, in the case that the user settings, which is a common content setting item, is selected in the second hierarchical level, for example, a setting input screen such as that which is illustrated in FIG. 4F is displayed on the second display unit 47 as a setting input screen in the third hierarchical level. Information which is necessary to add a user registration is input and set in the setting input screen illustrated in FIG. 4F.

Meanwhile, while the setting input screen of the third hierarchical level is being displayed on the second display unit 47 and the input of settings of information which is necessary to add a user registration is being performed, the first display unit 33 displays a screen that indicates that operations are being conducted at the first printing unit ("Operations being conducted at the other printer") as illustrated in FIG. 4E.

Figure 4G:
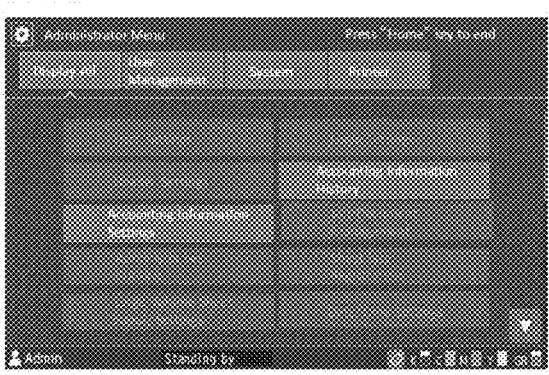
FIG. 4G is a diagram that illustrates a second example of the transition of the setting input screen on the first display unit and the second display unit.
Figure 4H:
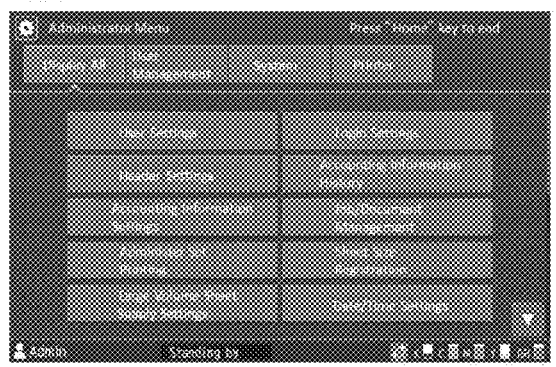
FIG. 4H is a diagram that illustrates a second example of the transition of the setting input screen on the first display unit and the second display unit.

Then, in the case that the user completes the input of settings of the information which is necessary for user registration, a "Close" button in the setting input screen of the third hierarchical level is touched on the second display unit 47. Next, in the case that the "Close" button is touched, both the first display unit 33 and the second display unit 47 switch to the setting input screen of the immediately preceding second hierarchical level, as illustrated in FIGS. 4G and 4H.

In addition, in the case that the "Close" button is touched on the third hierarchical level setting input screen of the second display unit 47, that is, in the case that an instruction to confirm the contents of settings is input, the control unit 44 causes the second interface unit 46 to send the setting input information related to the user registration to the first printing device 20. The setting input information related to the user registration which is sent from the second printing device 40 to the first printing device 20 is received by the first interface unit 29b of the first printing device 20, is stored and updated in the storage unit 29a, and managed by the control unit 28.

By sending the setting input information related to the user registration, which is set and input at the second printing device 40 to the first printing device 20, and storing it in the first printing device 20 in this manner, the setting input information related to the user registration can be shared by the first printing device 20 and the second printing device 40. Accordingly, when the first printing device 20 confirms the user registration settings, for example, it is possible to present the current setting input information of the second printing device 40.

In addition, in the case that the setting input information related to the user registration is sent from the second printing device 40 to the first printing device 20 as described above, it is preferable for information related to other unchanged setting items in the administrator menu to not be sent, and for only information related to the user registration which is changed in the third hierarchical level from the second printing device 40 to be sent to the first printing device 20. Thereby, the amount of data to be sent can be reduced and the data can be sent at high speed. As a result, the storage process can be performed at high speed in the first printing device 20, which is on the receiving side.

In addition, in the present embodiment, as described with reference to the first example and the second example, the setting input screens of the first hierarchical level of the first display unit 33 and the second display unit 47 are the same home screen, while different setting input screens are displayed on the first display unit 33 and the second display unit 47 as the setting input screens of the second hierarchical level. Therefore, it is possible to perform a first input operation at the home screen which is displayed by either of the first display unit 33 and the second display unit 47. Accordingly, because the user can perform operations from either of the first display unit 33 and the second display unit 47, operability can be improved.

Next, a third example which is illustrated in FIG. 5 will be described. In the third example as well, immediately after the power of the printing system 1 is turned ON, the home screen is displayed on both the first display unit 33 and the second display unit 47, as illustrated in FIGS. 5A and 5B.

In the case that the administrator menu which is displayed on the first display unit 33 is selected, the first display unit 33 displays all of the setting items of the administrator menu as described above, and enables the selection of these setting items and input of settings.

Figure 5A:
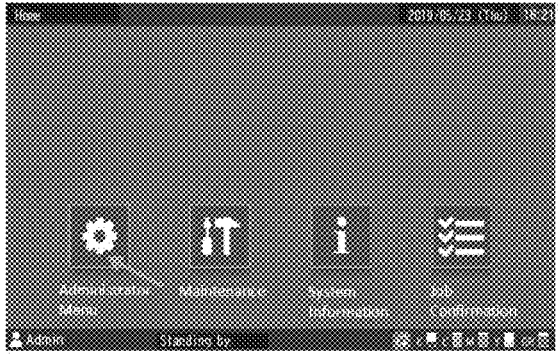
FIG. 5A is a diagram that illustrates a third example of the transition of the setting input screen on the first display unit and the second display unit.
Figure 5B:
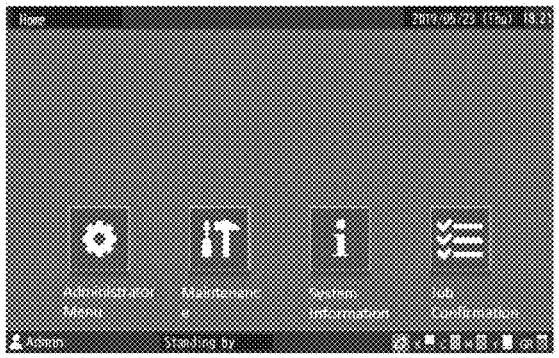
FIG. 5B is a diagram that illustrates a third example of the transition of the setting input screen on the first display unit and the second display unit.
Figure 5C:
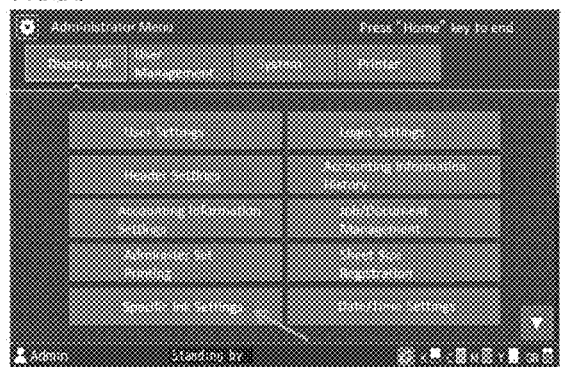
FIG. 5C is a diagram that illustrates a third example of the transition of the setting input screen on the first display unit and the second display unit.
Figure 5D:
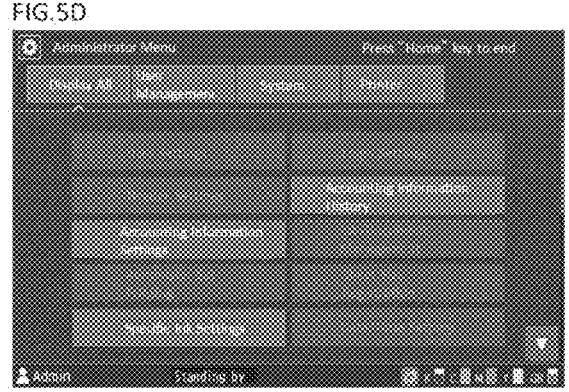
FIG. 5D is a diagram that illustrates a third example of the transition of the setting input screen on the first display unit and the second display unit.

Meanwhile, at this time, the second display unit 47 displays only a portion of the setting items, for which settings unique to the second printing unit are to be set, from among all of the setting items of the administrator menu, such that input of settings is enabled for these items, as illustrated in FIG. 5D. Then, the second display unit 47 displays the setting items for which the same contents are to be set in the first printing unit and the second printing unit in a grayed out manner, and disables the input of settings for these setting items.

The specific ink settings illustrated in FIGS. 5C and 5D is a setting item which is uniquely set for the first printing unit and the second printing unit as described above. Therefore, this setting item is displayed and the input of settings is enabled at both of the first display unit 33 and the second display unit 47.

Figure 5E:
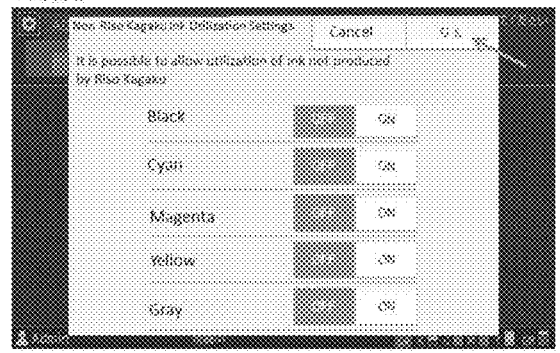
FIG. 5E is a diagram that illustrates a third example of the transition of the setting input screen on the first display unit and the second display unit.

Next, in the case that the specific ink settings is selected in the setting input screen of the second hierarchical level of the first display unit 33, for example, the setting input screen of a third hierarchical level such as that which is illustrated in FIG. 5E is displayed on the first display unit 33. In the setting input screen illustrated in FIG. 5E, prohibition (OFF) or permission (ON) for specific inks is input and set for each color.

Figure 5F:
FIG. 5F is a diagram that illustrates a third example of the transition of the setting input screen on the first display unit and the second display unit.

Meanwhile, while the setting input screen of the third hierarchical level is being displayed on the first display unit 33 and the input of settings to prohibit (OFF) or to permit (ON) specific inks is being performed, the second display unit 47 continues to display the setting input screen of the second hierarchical level setting input screen as illustrated in FIG. 5F.

Figure 5G:
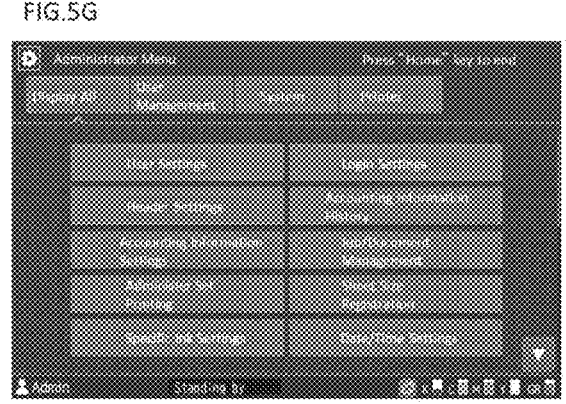
FIG. 5G is a diagram that illustrates a third example of the transition of the setting input screen on the first display unit and the second display unit.
Figure 5H:
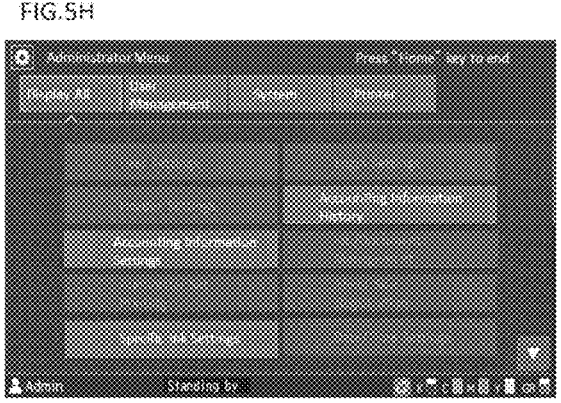
FIG. 5H is a diagram that illustrates a third example of the transition of the setting input screen on the first display unit and the second display unit.

Then, in the case that the user finishes the input of settings of the specific ink for each color, the "OK" button is touched in the setting input screen of the third hierarchical level which is displayed by the first display unit 33. In the case that the "OK" button is touched, the first display unit 33 is switched to the setting input screen of the immediately preceding second hierarchical level, and the second display unit 47 continues to display the second hierarchical level setting input screen, as illustrated in FIGS. 5G and 5H.

Note that the third example differs from the first example and the second example in that the setting items which are uniquely set are selected at the first printing unit and the second printing unit. Therefore, sharing of the setting input information as in the first example and the second example is not necessary.

Next, a fourth example which is illustrated in FIG. 6 will be described. In the fourth example as well, immediately after the power of the printing system 1 is turned ON, the home screen is displayed on both of the first display unit 33 and the second display unit 47, as illustrated in FIGS. 6A and 6B.

Figure 6A:
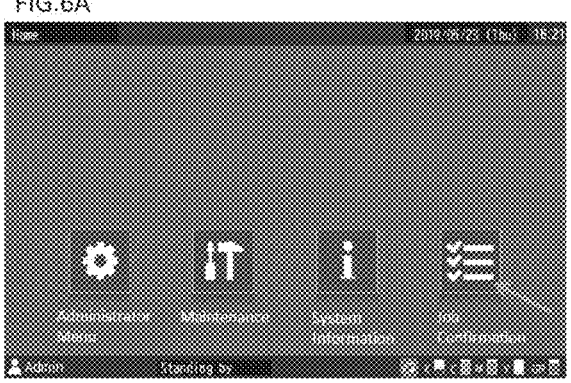
FIG. 6A is a diagram that illustrates a fourth example of the transition of the setting input screen on the first display unit and the second display unit.
Figure 6B:
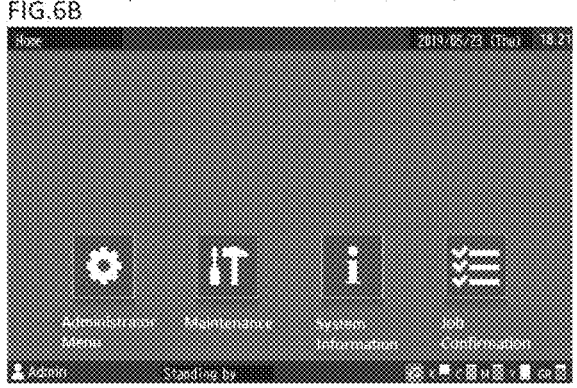
FIG. 6B is a diagram that illustrates a fourth example of the transition of the setting input screen on the first display unit and the second display unit.
Figure 6C:
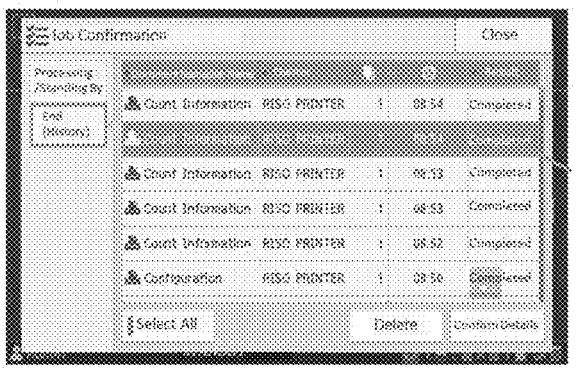
FIG. 6C is a diagram that illustrates a fourth example of the transition of the setting input screen on the first display unit and the second display unit.

Next, in the case that the job confirmation is selected on the home screen of the first display unit 33, the first display unit 33 displays an edit screen for information of a print job (first print data) which was received by the first printing device 20 as a setting input screen of the second hierarchical level, as illustrated in FIG. 6C. On the edit screen for print job, print job information (job name, owner name, number of copies, print processing time, print processing result, etc.) is displayed as a list, and a "Delete" button and a "Confirm Details" button are also displayed.

Here, the print job which is input to the printing system 1 of the present embodiment utilizes both of the first printing device 20 (first printing unit) and the second printing device 40 (second printing unit) to perform a printing process. That is, the print job information described above is common to the first printing unit and the second printing unit.

Figure 6D:
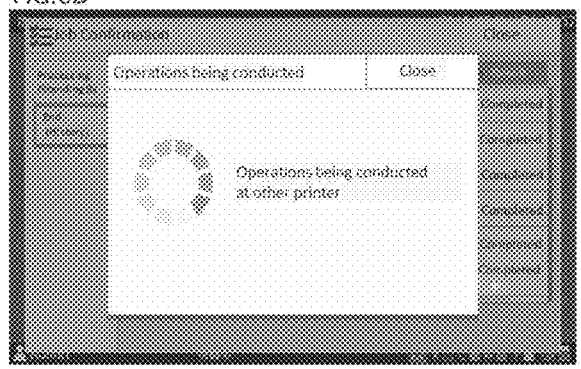
FIG. 6D is a diagram that illustrates a fourth example of the transition of the setting input screen on the first display unit and the second display unit.

Therefore, when the screen of FIG. 6C is being displayed on the first display unit 33, the second display unit 47 displays a screen that indicates that operations are being conducted at the first printing unit ("Operations being conducted at the other printer") as illustrated in FIG. 6D. Thereby, selection of the job confirmation item is disabled at the second display unit 47. In addition, the second display unit 47 displays a "Close" button on the screen that indicates that operations are being conducted at the first printing unit at this time.

Figure 6E:
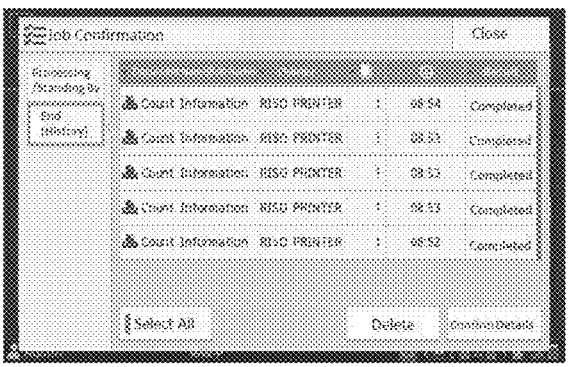
FIG. 6E is a diagram that illustrates a fourth example of the transition of the setting input screen on the first display unit and the second display unit.

Next, in the case that the user selects a print job to be deleted and touches the "Delete" button on the edit screen illustrated in FIG. 6C, the first display unit 33 displays the list of print jobs from which the selected print job has been deleted, as illustrated in FIG. 6E. Here, the print job indicated by the arrow in FIG. 6C is deleted.

Figure 6F:
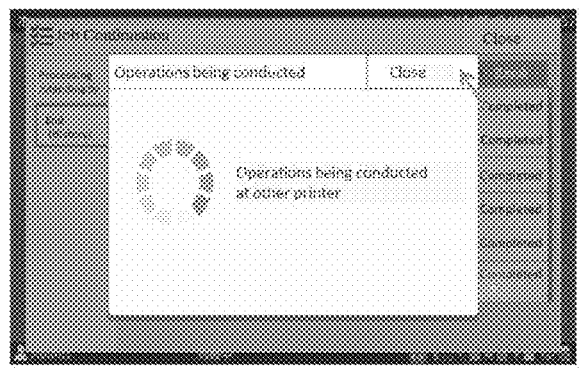
FIG. 6F is a diagram that illustrates a fourth example of the transition of the setting input screen on the first display unit and the second display unit.

Meanwhile, the second display unit 47 also displays a screen that indicates that operations are being conducted at the first printing unit ("Operations being conducted at the other printer") during the deletion operation, as illustrated in FIG. 6F.

Figure 6G:
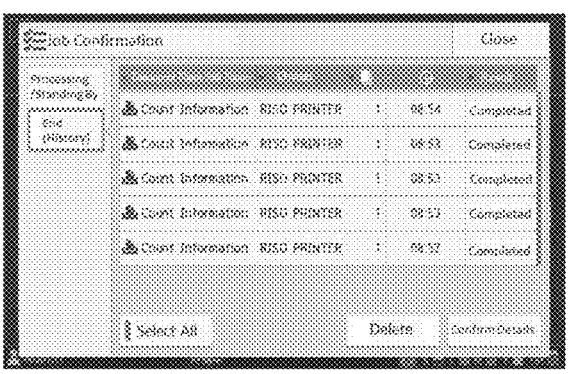
FIG. 6G is a diagram that illustrates a fourth example of the transition of the setting input screen on the first display unit and the second display unit.
Figure 6H:
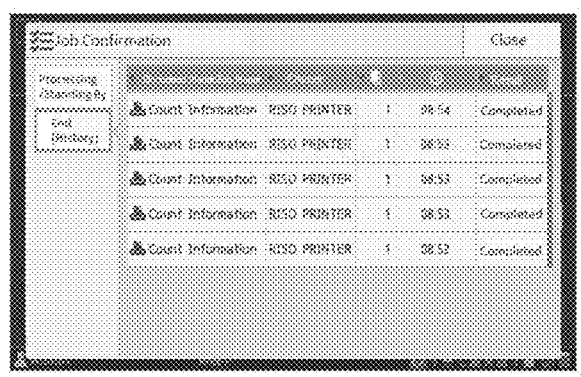
FIG. 6H is a diagram that illustrates a fourth example of the transition of the setting input screen on the first display unit and the second display unit.

If the "Close" button illustrated in FIG. 6F is touched while the screen illustrated in FIG. 6F is being displayed on the second display unit 47, the second display unit 47 switches to display of the same screen as that displayed on the first display unit 33, as illustrated in FIGS. 6G and 6H.

In the case that the "Close" button which is illustrated in FIG. 6F is touched, the control unit 28 sends the setting input information related to the job confirmation to the second printing device 40 with the first interface unit 29b. The setting input information which is sent from the first printing device 20 to the second printing device 40 is received by the second interface unit 46 of the second printing device 40, is stored and updated in the storage unit 45, and managed by the control unit 44.

The setting input information related to the job confirmation which is input and set in the first printing device 20 is sent to the second printing device 40 and stored in the second printing device 40 in this manner. Thereby, it is possible for the first printing device 20 and the second printing device 40 to share the setting input information.

That is, both the first display unit 33 and the second display unit 47 display the list of print jobs. At this time, the list of the second display unit 47 is the same as the list displayed on the first display unit 33, which is the most up to date list. Specifically, a list in which the print job selected on the screen of FIG. 6C has been deleted can be displayed. By reflecting the contents which are input and set on the first display unit 33 on the second display unit 47 as well, it is possible for the user to confirm the most up to date setting contents on both the first display unit 33 and the second display unit 47.

In addition, in the case that the setting input information related to the job confirmation is sent from the first printing device 20 to the second printing device 40 as described above, it is preferable for information related to other unchanged setting items in the administrator menu to not be sent, and for only information related to the job confirmation which is changed in the second hierarchical level from the first printing device 20 to be sent to the second printing device 40. Thereby, the amount of data to be sent can be reduced and the data can be sent at high speed. As a result, the storage process can be performed at high speed in the second printing device 40, which is on the receiving side.

In the description above, a case in which the "Close" button which is illustrated in FIG. 6F is touched has been described. However, the same process is performed in the case that the "Close" button which is illustrated in FIG. 6E is touched, and the setting input information is shared between the first printing device 20 and the second printing device 40.

In addition, in the example illustrated in FIG. 6, the case where "Job confirmation" is selected on the home screen has been described. However, "Job/Document management" which is included in the aforementioned administrator menu is also a setting item regarding a print job. Therefore, it is a common content setting item. Accordingly, "Job/Document management" is displayed in a grayed out manner on the setting input screen of the second hierarchical level as illustrated in FIG. 3D, for example, and input of settings is enabled at only one of the first display unit 33 and the second display unit 47.

In addition, "Job/Document management" displays a list of print jobs in the same manner as "Job Confirmation", and receives input of settings for saving the print jobs in a USB memory, and input of reprinting settings for the saved print jobs.

Figure 7:
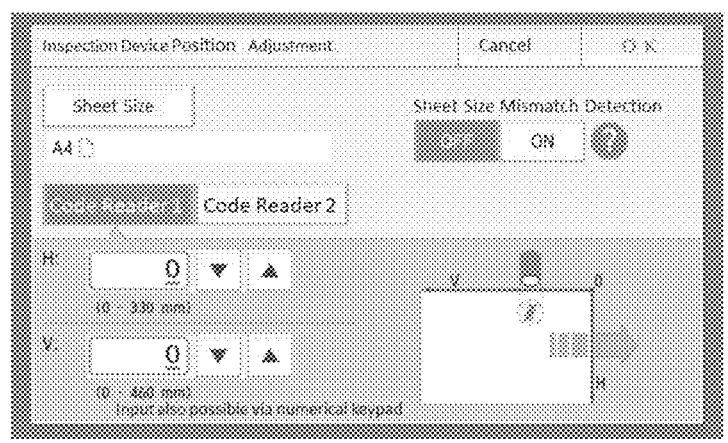
FIG. 7 is a diagram that illustrates an example of the setting input screen for adjusting the position of an inspection device.

Note in the first, second, and fourth examples described above, in the case that the setting input information is sent and received between the first printing device 20 and the second printing device 40, only the information of the setting item of the hierarchical level which has been input and set is sent and received. However, there are cases in which a setting item of a sub-hierarchical level may present among setting items of a predetermined hierarchical level, for example. Specifically, a setting input screen such as that which is illustrated in FIG. 7 is displayed in the case that the setting item is inspection device position adjustment, for example. It is possible to set a sheet size, sheet size mismatch detection, a code reader 1, a code reader 2, and coordinates H and V in the setting input screen which is illustrated in FIG. 7.

In this case, the sheet size, the sheet size mismatch detection, the code reader 1 and the code reader 2 are setting items of a main hierarchical level, and the coordinates H and V are setting items of a sub hierarchical level. In the case that there are sub hierarchical level setting items within one setting item in this manner, there are cases in which only the main hierarchical level setting item is set, cases in which only the sub hierarchical level setting items are set, and cases in which both the main hierarchical level setting item and the sub hierarchical level setting items are set.

In such a case, in the case that the setting items of both the main hierarchical level and the sub hierarchical level are set or in the case that only a setting item of the main hierarchical level is set, the setting input information of both the main hierarchical level and the sub hierarchical level is are sent and received between the first printing device 20 and the second printing device 40. On the other hand, it is preferable for only the setting input information (coordinates H, V) of the setting items of the sub hierarchical level to be sent and received between the first printing device 20 and the second printing device 40 in the case that only setting items of the sub hierarchical level are set. Thereby, the amount of data which is sent and received can be further reduced. However, in the case that information on the name of a setting item of the main hierarchical level is required for data management, the name of the setting item of the main hierarchical level and the setting input information (coordinates H, V) of the setting item of the sub hierarchical level may be sent and received between the device 20 and the second printing device 40.

In addition, in the embodiment described above, with respect to the setting items which are uniquely set for the first printing unit and the second printing unit, input of settings are enabled at both the first display unit 33 of the first printing device 20 and the second display unit 47 of the second printing device 40. However, the setting input screen of the second printing unit may be displayed on the first display unit 33 of the first printing device 20, and input of the unique content settings for the second printing unit may be received at the first display unit 33. Then, the setting input information may be sent from the first interface unit 29b of the first printing device 20 to the second interface unit 46 of the second printing device 40, stored and updated in the storage unit 45 of the second printing device 40, and managed.

Conversely, the setting input screen of the first printing unit may be displayed on the second display unit 47 of the second printing device 40, and input of the unique content settings for the first printing unit may be received at the second display unit 47. Then, the setting input information may be sent from the second interface unit 46 of the second printing device 40 to the first interface unit 29b of the first printing device 20, stored and updated in the storage unit 29a of the second printing device 20, and managed.

Thereby, the input of settings of the unique content setting items for both the first printing unit and the second printing unit can be performed at either one of the first printing device 20 and the second printing device 40, and operability can be improved.

In addition, in the case in which one display unit accepts the input of settings of the unique content setting item of the other printing unit as described above, a guidance message (hereinafter, referred to as "switching enabled guidance message") indicating that it is possible to switch to the setting input screen of the other printing unit may be displayed on the one display unit. In the case that a predetermined function key or the like is pressed or in the case that the switching enabled guidance message is touched, the setting input screen on the one display may be switched to the setting input screen of the other printing unit.

Figure 8:
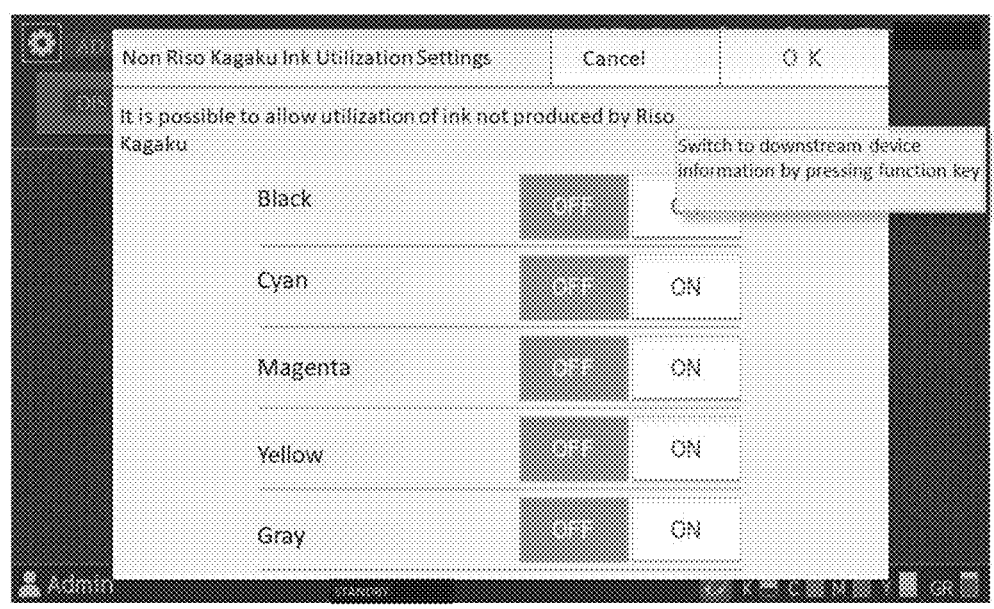
FIG. 8 is a diagram that illustrates an example of a switching enabled guidance message which is displayed on the setting input screen for a specific ink setting.

FIG. 8 is a diagram that illustrates an example of a switching enabled guidance message which is displayed on the setting input screen for specific ink settings which are illustrated in FIG. 5E. Note that although FIG. 8 illustrates an example in which the switching enabled guidance message is displayed on the setting input screen for the specific ink settings, similar switching enabled guidance message is also displayed on the setting input screens for other unique content setting items such as accounting information history, accounting information settings, supply stock management, cleaning cycle settings, and envelope sheet supply settings.

Then, in the case that a predetermined function key or the like is pressed or in the case that the switching enabled guidance message is touched, for example, the setting input screen of the other printing unit is displayed as described above. During this display, it is preferable for the display unit of the other printing unit to cease display of the setting input screen, and for the display unit to be in a sleep mode. Thereby, it is possible to prevent the same setting item from being input and set in the two printing units at the same time, and also possible to reduce power consumption. Then, the display unit of the other printing unit may be restored again in the case that the input of settings on the setting input screen of the one printing unit is completed (for example, in the case that the "OK" button or the "Close" button is touched).

In addition, in the printing system 1 of the embodiment described above, a configuration may be adopted, in which it is possible for the first display unit 33 to be attached to and detached from the first printing device 20, and possible for the second display unit 47 to be attached to and detached from the second printing device 40.

Note that print processing may be performed by only one of the first printing device 20 or the second printing device 40 utilizing the print job which is input to the printing system 1. In this case, the common content setting items and the unique setting items are changed as necessary in the embodiment described above. For example, the "large volume sheet feed settings" remain a common content setting item, but the "job confirmation" changes from a common content setting item to a unique content setting item.

Further, in the printing system 1 of the embodiment described above, the first display unit 33 or the second display unit 47 at the side in which the unique error occurred may display a setting item for clearing the unique error such that input of settings is enabled in the case that a unique error occurs in either of the first printing unit or the second printing unit, for example. A message such as "Error occurrence at the other printer" may be displayed on the display unit of the other printing unit. It is preferable for the error display that includes the above message to be continued until the error is cleared. The aforementioned unique errors include, a door opening/closing error indicating that a front door of the housing is in an open state, a sheet depleted error in the sheet supply device 10, an ink depleted error in the first printing device 20 or the second printing device 40, an elevation error of the sheet discharge tray 61 in the sheet discharge device 60, and component replacement errors in each of the devices, for example.

In addition, setting items that display the procedures for clearing the unique errors may be the setting items for clearing the unique errors, for example.

As described above, in the case that a unique error occurs in one of the printing units, a setting item for clearing the unique error is displayed on the display unit of the one printing unit such that input of settings is enabled, and a message that indicates that a unique error is occurring in the one printing unit is displayed on the display unit of the other printing unit. Thereby, it is possible for users who are near the printing unit in which no unique error has occurred to be promptly notified that an error is occurring. At the same time, the user can quickly clear the error by viewing the display unit of the printing unit in which the error has occurred. Accordingly, operability of error solution can be improved.

In addition, in the case that an error such as a jam error occurs in at least one of the first printing unit and the second printing unit, for example, the error occurrence state of the first printing unit may be displayed on the first display unit 33, and a guidance message indicating that it is possible to switch to a screen that shows the error occurrence state of the second printing unit (hereinafter, referred to as an "error switching enabled guidance message") may also be displayed on the first display unit 33. In addition, the error occurrence state of the second printing unit may be displayed on the second display unit 47, and an error switching enabled guidance message indicating that it is possible to switch to a screen that shows the error occurrence state of the first printing unit may also be displayed on the second display unit 47.

Figure 9:
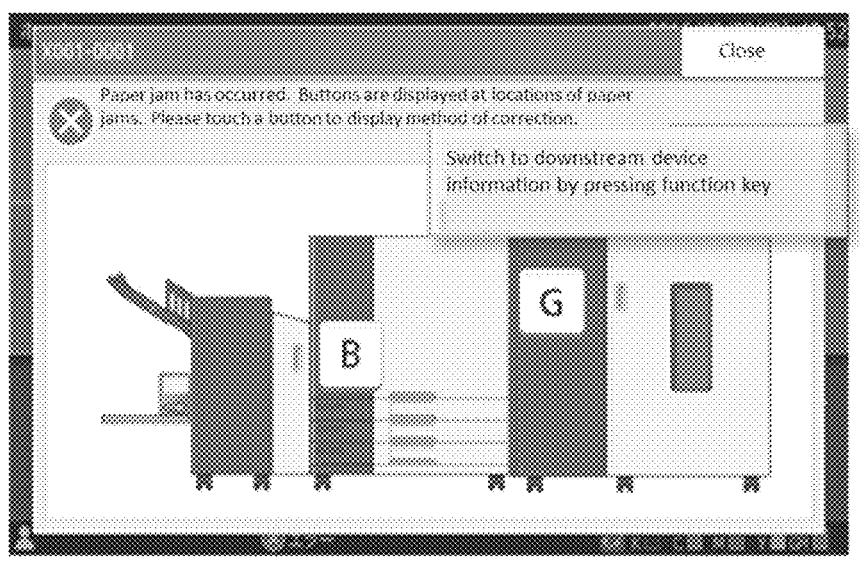
FIG. 9 is a diagram that illustrates an example of a jam error display on a first printing unit which is provided on an upstream side.

FIG. 9 is a diagram that illustrates an example of a jam error display on the first printing unit which is provided on an upstream side. In FIG. 9, a jam error display that indicates a location where a jam has occurred and an error switching enabled guidance message ("Downstream device information available by pressing function key") are displayed. In the state which is illustrated in FIG. 9, in the case that the user presses a predetermined function key or touches the error switching enabled guidance message illustrated in FIG. 9, the display is switched to a jam error display of the second printing unit on a downstream side.

Figure 10:
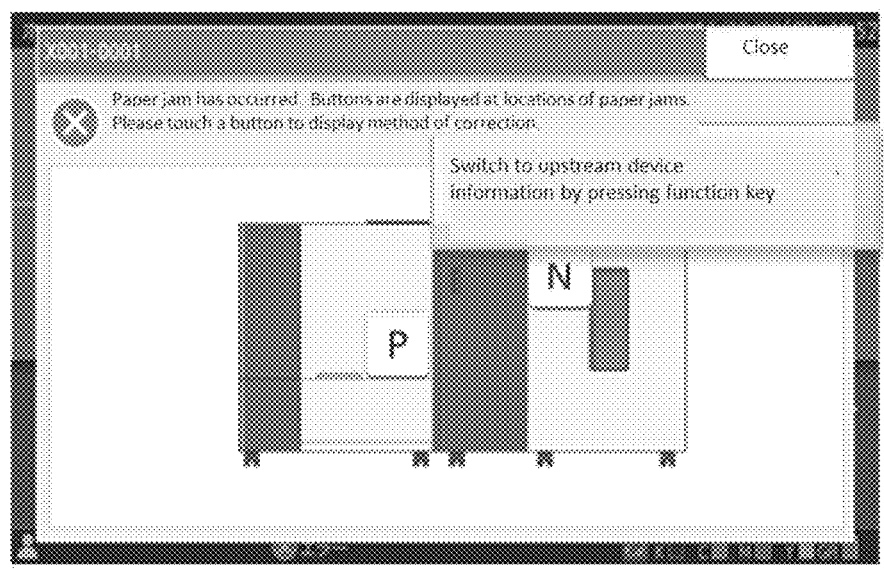
FIG. 10 is a diagram that illustrates an example of jam error display on a second printing unit which is provided on the downstream side.

FIG. 10 is a diagram that illustrates an example of a jam error display on the second printing unit which is provided on the downstream side. In FIG. 10, a jam error display that indicates a location where a jam has occurred and an error switching enabled guidance message ("Upstream device information available by pressing function key") are displayed. In the state which is illustrated in FIG. 10, in the case that the user presses a predetermined function key again or in the case that the error switching enabled guidance message illustrated in FIG. 10 is touched, the display is switched to the jam error display of the first printing unit on the upstream side.

Thereby, it is possible to confirm and clear the error occurrence state of the first printing unit and the second printing unit from either of the first printing device 20 and the second printing device 40, and operability can be improved.

In addition, in the printing system 1 of the embodiment described above, the first display unit 33 and the second display unit 47 are provided in both the first printing unit and the second printing unit. However, a display unit may be provided in only one of the first printing unit and the second printing unit.

In the case that the display unit is provided only on one of the first printing unit and the second printing unit in this manner, it is preferable for the display unit to be capable of being attached to and detached from either of the first printing device 20 and the second printing device 40. Thereby, the input of settings for the first printing unit and the second printing unit can be input from either of the first printing device 20 and the second printing device 40, and operability can be improved.

Further, in the case that the display unit is provided only on one of the first printing unit and the second printing unit, all of the setting items are displayed on the display unit. However, in the case that settings are input for setting items having the same contents for the first printing unit and the second printing unit, it is preferable for the setting input information to be sent and received between the first printing device 20 and the second printing device 40, as in the embodiment described above. For example, in the case that a common content setting item is input and set in a state in which the display unit attached to the first printing unit, the setting input information is sent from the first printing device 20 to the second printing device 40 and stored. Thereby, in the case that the display unit is detached from the first printing device 20 and attached to the second printing device 40, current setting input information can be reflected and presented on the display unit.

Figure 11:
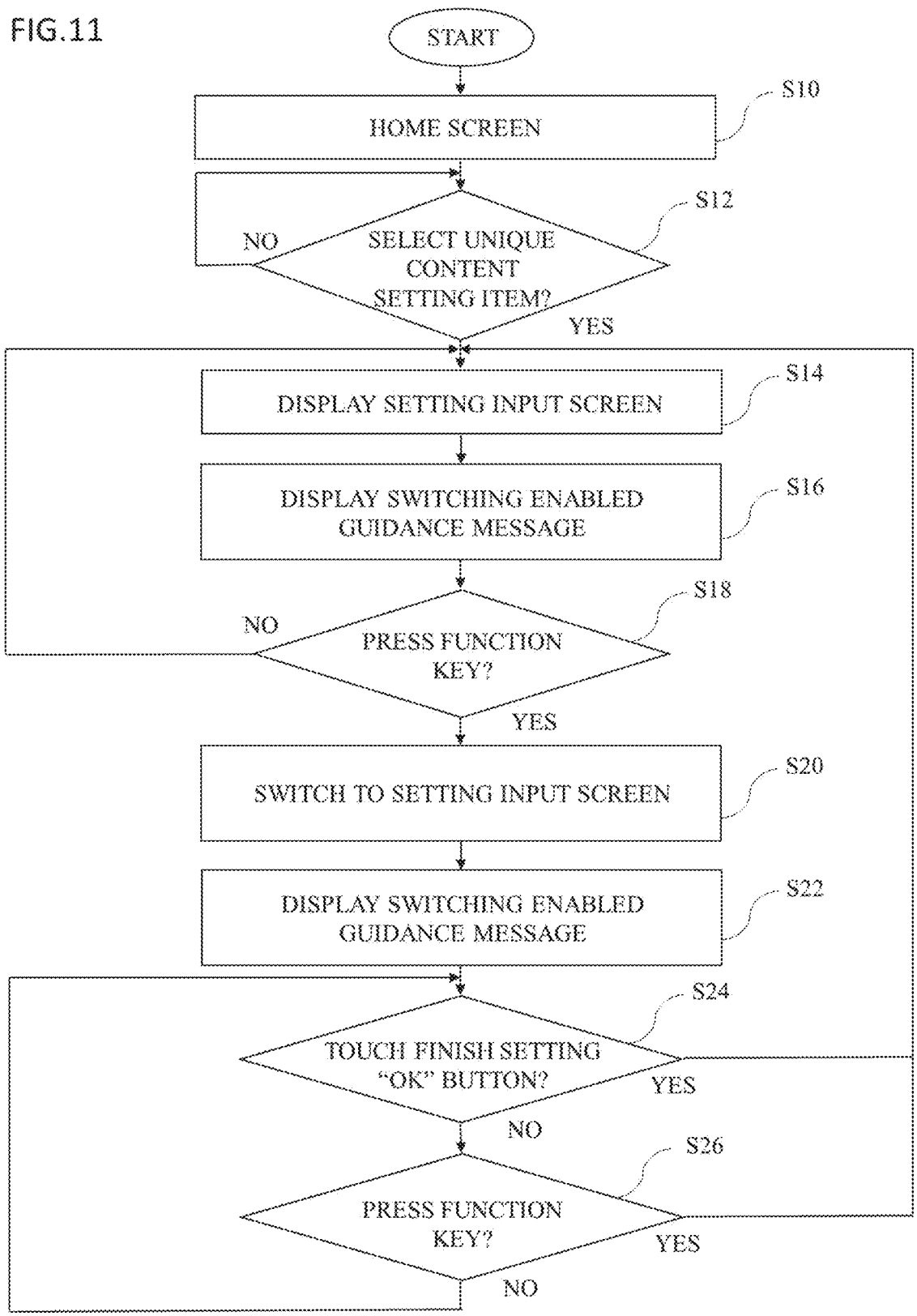
FIG. 11 is a flow chart for explaining the flow of processes in the case that a specific ink setting for the second printing unit is input in the case that a display unit is mounted on the first printing unit.

In addition, in the case that the display unit is provided only on one of the first printing unit and the second printing unit, all of the setting items are displayed on the display unit. However, with respect to setting items having contents which are unique to the first printing unit and the second printing unit, it is preferable for a switching enabled guidance message to be displayed as illustrated in FIG. 8. Then, it is preferable for display to be switched to the setting input screen of the unique content setting items for the printing unit to which the display unit is not attached, in the case that a predetermined function key is pressed or when the switching enabled guidance message is touched. Here, a process of inputting specific ink settings, which is a unique content setting item of the second printing unit, in the case that the display unit is attached to the first printing device 20, for example, will be described with reference to the flow chart of FIG. 11.

First, immediately after the power of the printing system 1 is turned ON, the home screen described above is displayed on the display unit (S10).

Next, in the case that the administrator menu is selected on the home screen of the display unit, all of the setting items of the administrator menu are displayed on the display unit. Then, in the case that the user touches the specific ink settings, the control unit 28 of the first printing device 20 refers to a table which is set in advance, to judge whether the setting item which was touched by the user is a unique content setting item (S12).

In the case that the touched setting item is the specific ink settings, the control unit 28 displays the setting input screen of the specific ink setting illustrated in FIG. 8 (S14) because it is a unique content setting item (S12: YES). Then, a switching enabled guidance message ("Downstream device information available by pressing function key", for example) is displayed (S16), as illustrated in FIG. 8.

Figure 12:
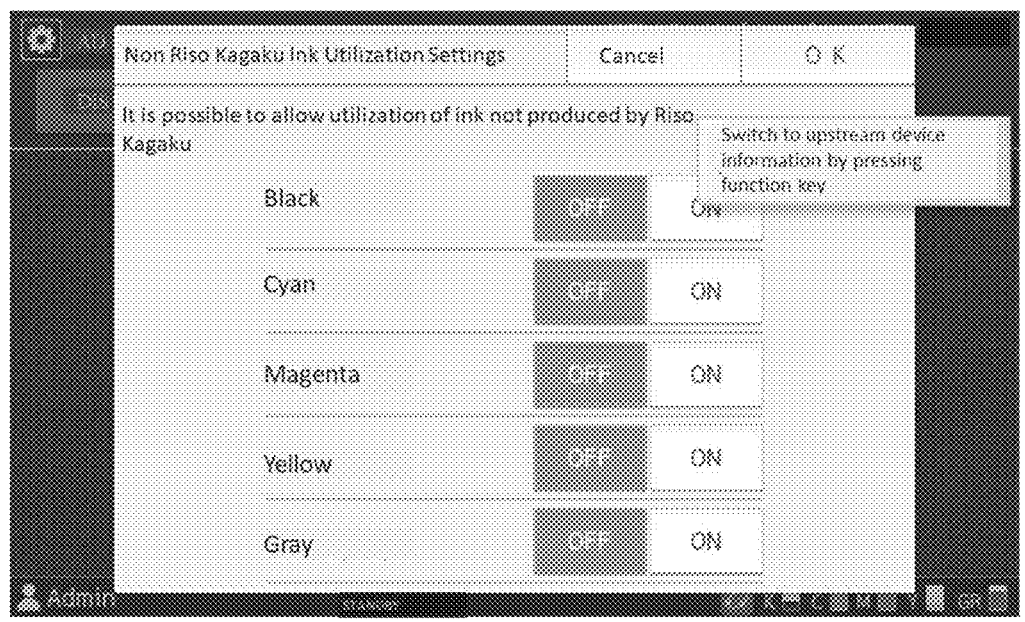
FIG. 12 is a diagram that illustrates an example of display of a switching enabled guidance which is displayed on the setting input screen for a specific ink setting of the second printing unit which is provided on the downstream side.

In the case that a user presses a predetermined function key or touches the switching enabled guidance message (S18: YES), the screen is switched to the setting input screen for the specific ink settings of the second printing device 40 (S20). In addition, a switching enabled guidance message ("Upstream device information available by pressing function key", for example) is displayed (S22) on the setting input screen for the specific ink settings of the second printing device 40, as illustrated in FIG. 12.

Then, in the case that the input of settings for the specific ink settings of the second printing device 40 is performed in the setting input screen and the "OK" button is touched (S24, YES), the screen returns to the setting input screen for the specific ink settings of the first printing device 20 (S14). In addition, in the case that the user presses the predetermined function key again or in the case that the switching enabled guidance message illustrated in FIG. 12 is touched (S26, YES), the screen returns to the setting input screen for the specific ink setting of the first printing device 20 again (S14).

In addition, in the case that the display unit is provided only on one of the first printing unit and the second printing unit as described above, if an error occurs in at least one of the first printing unit and the second printing unit, for example, first, the state of the printing unit on which the display unit is mounted may be displayed on the display unit, and an error switching enabled guidance message may be displayed together with the display. For example, a jam error display in the case that the display unit is attached to the first printing unit which is on the upstream side is the same as that illustrated in FIG. 9. In the case that the user presses a predetermined function key or in the case that the error switching enabled guidance message illustrated in FIG. 9 is touched in the state illustrated in FIG. 9, display is switched to a jam error display of the downstream second printing unit which is on the downstream side and to which the display unit is not attached. The jam error display after switching, of the second printing unit which is on the downstream side is the same as that illustrated in FIG. 10.

In the case that the user presses the predetermined function key again or in the case that the error switching enabled guidance message illustrated in FIG. 10 is touched in the state illustrated in FIG. 10, the display returns to the jam error display of the upstream first printing unit.

Thereby, it is possible to confirm and clear the error occurrence state of the first printing unit and the second printing unit from either of the first printing device 20 and the second printing device 40, and operability can be improved.

Here, in the printing system 1 that includes a plurality of printing devices as described above, there are cases in which a large volume sheet supply device 10 and a large volume sheet discharge device 60 are connected for the purpose of obtaining a high volume of printed materials in a shorter time than had been conventionally possible. In the case that such a sheet supply device 10 and a sheet discharge device 60 are connected, a conveyance error such as a jam error may occasionally occur, depending on the frequency of use of these devices, the first printing device 20, and the second printing device 40, as well as installation environments.

In a typical printing device, in the case that a conveyance error occurs, a method has been proposed in which a user is prompted to clear the conveyance error, by displaying the location of the conveyance error on an operation panel.

However, in a printing system in which the plurality printing devices, which are the first printing device 20 and the second printing device 40, are connected as described above, conveyance of print media is related to the entire printing system 1. However, how to notify a user of a location at which a conveyance error has occurred has not been considered to a great degree.

In the description of the above embodiment, an example in which a jam error display is performed on the first display unit 33 and the second display unit 47, and an error switching enabled guidance message is also displayed in the case that a jam error occurs as illustrated in FIGS. 9 and 10, and an example in which the first display unit 33 or the second display unit 47, at which a unique error has occurred, displays a setting item for clearing the unique error is displayed with input of settings enabled, while a message such as "An error has occurred in the other printer" is displayed on the display unit of the other printing unit in the case that the unique error occurs in one of the first printing unit and the second printing unit have been described. An embodiment for cases that include these examples, in which a conveyance error and errors other than the conveyance error are detected, will be described in detail. The embodiment described above is referred to as a first embodiment, and the embodiment to be described below is referred to as a second embodiment. In the following description, points which are different from the first embodiment will be mainly described.

The overall configuration of the printing system 1 of the second embodiment is the same as that of the printing system 1 of the first embodiment, as illustrated in FIG. 1.

Figure 13:
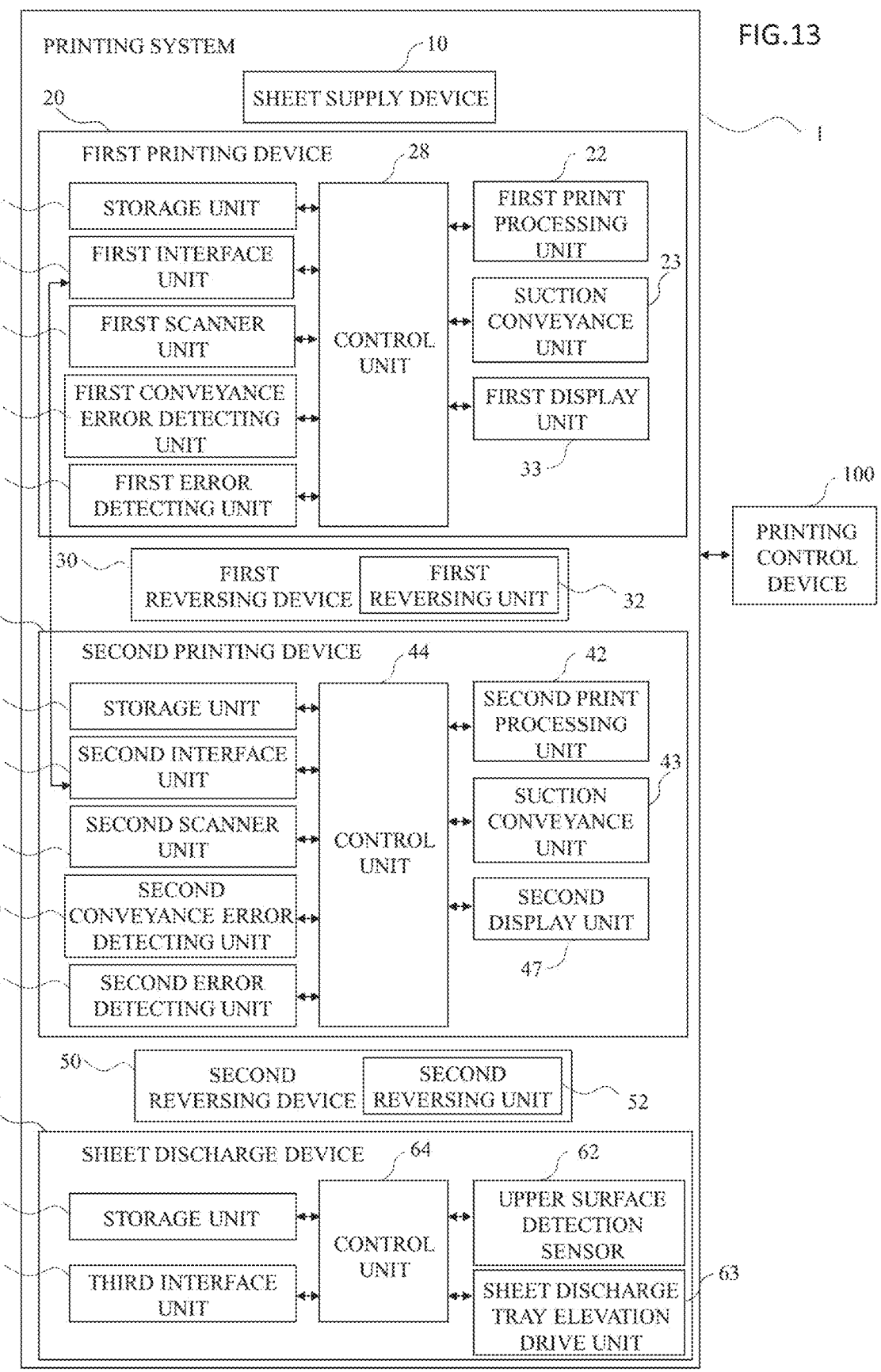
FIG. 13 is a block diagram that illustrates the schematic configuration of a control system of the printing system according to a second embodiment.

As illustrated in FIG. 13, the first printing device 20 of the second embodiment is further equipped with a first conveyance error detecting unit 35 and a first error detecting unit 36.

In addition, in the second embodiment, the first display unit 33 displays an occurrence state of a conveyance error of the first printing unit in the case that a conveyance error of the print medium S occurs in at least one of the first printing unit that includes the sheet supply device 10, the first printing device 20, and the first reversing device 30, and the second printing unit that includes the second printing device 40 and the second reversing device 50.

Conveyance errors are errors related to the conveyance of the print medium S. Examples of conveyance errors include a jam error of the print medium S, a double feed error, an idle conveyance error, etc. However, any error that occurs due to the conveyance of the print medium S may be considered to be a conveyance error.

The first conveyance error detecting unit 35 detects a conveyance error of the print medium S in the sheet supply device 10, the first printing device 20, and the first reversing device 30. Specifically, the first conveyance error detecting unit 35 has a plurality of optical sensors which are provided on the conveyance route of the print medium S in the sheet supply device 10, the first printing device 20, and the first reversing device 30. Then, the presence or absence of conveyance of the print medium S is detected by each optical sensor of the first conveyance error detecting unit 35, and detection signals are output to the control unit 28. Note that in FIG. 13, the first conveyance error detecting unit 35 is shown in the first printing device 20, but a portion thereof is included in the sheet supply device 10 and the first reversing device 30.

The control unit 28 recognizes a conveyance error of the print medium S based on the presence or absence of the detection signals of the first conveyance error detecting unit 35, the input timing of the detection signal, etc. In the case that the control unit 28 recognizes a conveyance error, it temporarily ceases the operations of the sheet supply device 10, the first printing device 20, and the first reversing device 30. Then, the control unit 28 displays the occurrence state of the conveyance error on the first display unit 33 of the first printing device 20, and displays a message prompting the user to clear the conveyance error as well as a procedure for clearing the conveyance error. In addition, the control unit 28 outputs a signal indicating that a conveyance error has occurred in the first printing unit to the control unit 44 of the second printing device 40 via the first interface unit 29b.

The first error detecting unit 36 detects errors other than a conveyance error in the sheet supply device 10, the first printing device 20, and the first reversing device 30. Examples of the errors other than a conveyance error include, for example, a door opening/closing error indicating that the front doors of the housing of the sheet supply device 10, the first printing device 20, and the first reversing device 30, and the sheet supply device 10 are open, a sheet depleted error in the sheet supply device 10, an ink depleted error in the first printing device 20, a component replacement error in the sheet supply device 10, the first printing device 20, and the first reversing device 30, etc. The first error detecting unit 36 includes a sensor for detecting the door opening/closing error, the sheet depleted error, and the ink depleted error, a timer for detecting the component replacement error, a printed sheet number counter, etc. Although the first error detecting unit 36 is shown in the first printing device 20 in FIG. 13, a portion of the first error detecting unit 36 is included in the sheet supply device 10 and the first reversing device 30.

The signals which are detected by the sensor of the first error detecting unit 36 and a count number in the timer or the printed sheet number counter are output to the control unit 28.

The control unit 28 recognizes an error other than the aforementioned conveyance error based on the detection signals of the sensors which are output from the first error detecting unit 36 and the count number of the timer or the printed sheet number counter. In the case that the control unit 28 recognizes that the error has occurred in the first printing unit, the operations of the sheet supply device 10, the first printing device 20, and the first reversing device 30 are temporarily ceased. Then, the control unit 28 displays the occurrence state of the error on the first display unit 33 of the first printing device 20, and displays a message prompting the user to clear the error and a procedure for clearing the error. In addition, the control unit 28 also outputs a signal indicating that the error has occurred in the first printing unit to the control unit 44 of the second printing device 40 via the first interface unit 29b.

In addition, in the second embodiment, the first display unit 33 displays that a conveyance error has not occurred even in the case that a conveyance error occurs only in the second printing unit described above and a conveyance error does not occur in the first printing unit. The specific mode of display will be described later.

In addition, the first display unit 33 displays the aforementioned administrator menu, maintenance menu, job confirmation menu, etc. as a home screen, and in the case that a conveyance error or an error other than a conveyance error to be described later occurs, a screen that indicates an error occurrence state of a conveyance error or an error other than a conveyance error is hierarchically displayed as a screen which is different from the home screen.

Next, the second printing device 40 of the second embodiment is equipped with a second conveyance error detecting unit 49a and a second error detecting unit 49b, as illustrated in FIG. 13.

The second conveyance error detecting unit 49a detects a conveyance error of the print medium S in the second printing device 40, the second reversing device 50, and the sheet discharge device 60. Specifically, the second conveyance error detecting unit 49a has a plurality of optical sensors which are provided on the conveyance route of the print medium S in the second printing device 40, the second reversing device 50, and the sheet discharge device 60. Then, the presence or absence of conveyance of the print medium S is detected by each optical sensor of the second conveyance error detecting unit 49a, and detection signals are output to the control unit 44. Note that in FIG. 13, the second conveyance error detecting unit 49a is shown in the second printing device 40, but a portion thereof is included in the second reversing device 50 and the sheet discharge device 60. In addition, the detection signals of the conveyance error in the sheet discharge device 60 are output to the control unit 44 via the control unit 64 and the third interface unit 66 of the sheet discharge device 60.

The control unit 44 recognizes the conveyance error of the print medium S based on the presence or absence of the detection signals of the second conveyance error detecting unit 49a, the input timing of the detection signals, etc. In the case that the control unit 44 recognizes the conveyance error, it temporarily ceases the operations of the second printing device 40, the second reversing device 50, and the sheet discharge device 60. Then, the control unit 44 displays the occurrence state of the conveyance error on the second display unit 47 of the second printing device 40, and displays a message prompting the user to clear the conveyance error as well as a procedure for clearing the conveyance error. In addition, the control unit 44 outputs a signal indicating that a conveyance error has occurred in the second printing unit to the control unit 28 of the first printing device 20 via the second interface unit 46.

The second error detecting unit 49b detects errors other than the conveyance error in the second printing device 40, the second reversing device 50, and the sheet discharge device 60. Examples of the errors other than the conveyance error include a door opening/closing error indicating that the front door of the housing of the second printing device 40, the second reversing device 50, and the sheet discharge device 60 is open, an ink depleted error in the second printing device 40, an elevation error in the sheet discharge tray 61 of the sheet discharge device 60 to be described later, a component replacement error in the second printing device 40, the second reversing device 50, and the sheet discharge device 60, etc. The second error detecting unit 49b includes a sensor for detecting the door opening/closing error, the ink depleted error, and the sheet discharge tray elevation error, a timer for detecting a component replacement error, a printed sheet number counter, etc. In FIG. 13, the second error detector 49b is shown in the second printing device 40, but a portion thereof is included in the second reversing device 50 and the sheet discharge device 60.

The signals which are detected by the sensors of the second error detecting unit 49b and the count number in the timer or the printed sheet number counter are output to the control unit 44. The detection signals of the sheet discharge device 60 and the count number are output to the control unit 44 via the control unit 64 and the third interface unit 66 of the sheet discharge device 60.

The control unit 44 recognizes an error other than the aforementioned conveyance error based on the detection signals of the sensors which are output from the second error detecting unit 49b and the count number of the timer or the printed sheet number counter. In the case that the control unit 44 recognizes that the error has occurred in the second printing unit, it temporarily ceases the operations of the second printing device 40, the second reversing device 50, and the sheet discharge device 60. Then, the control unit 44 displays an error occurrence state on the second display unit 47 of the second printing device 40, and displays a message prompting the user to clear the error and a procedure for clearing the error. In addition, the control unit 44 outputs a signal indicating that the error has occurred in the second printing unit to the control unit 28 of the first printing device 20 via the second interface unit 46.

In the second embodiment, the second display unit 47 displays a conveyance error occurrence state in the second printing unit in the case that a conveyance error of the print medium S occurs in at least one of the first printing unit that includes the sheet supply device 10, the first printing device 20, and the first reversing device 30 and the second printing unit that includes the second printing device 40, the second reversing device 50, and the sheet discharge device 60.

In addition, the second display unit 47 displays a state indicating that a conveyance error has not occurred even in the case that a conveyance error occurs only in the first printing unit described above and a conveyance error does not occur in the second printing unit. The specific mode of display will be described later.

In addition, the second display unit 47 displays the aforementioned administrator menu, maintenance menu, job confirmation menu, etc. as a home screen, and in the case that a conveyance error or an error other than a conveyance error occurs, a screen that indicates an error occurrence state of a conveyance error or an error other than a conveyance error is hierarchically displayed as a screen which is different from the home screen.

In addition, in the second embodiment, in the case that an error other than the conveyance error and the aforementioned conveyance error occurs in the sheet discharge device 60, the control unit 64 outputs a signal indicating this fact to the control unit 44 of the second printing device 40 via the third interface unit 66.

Figure 14:
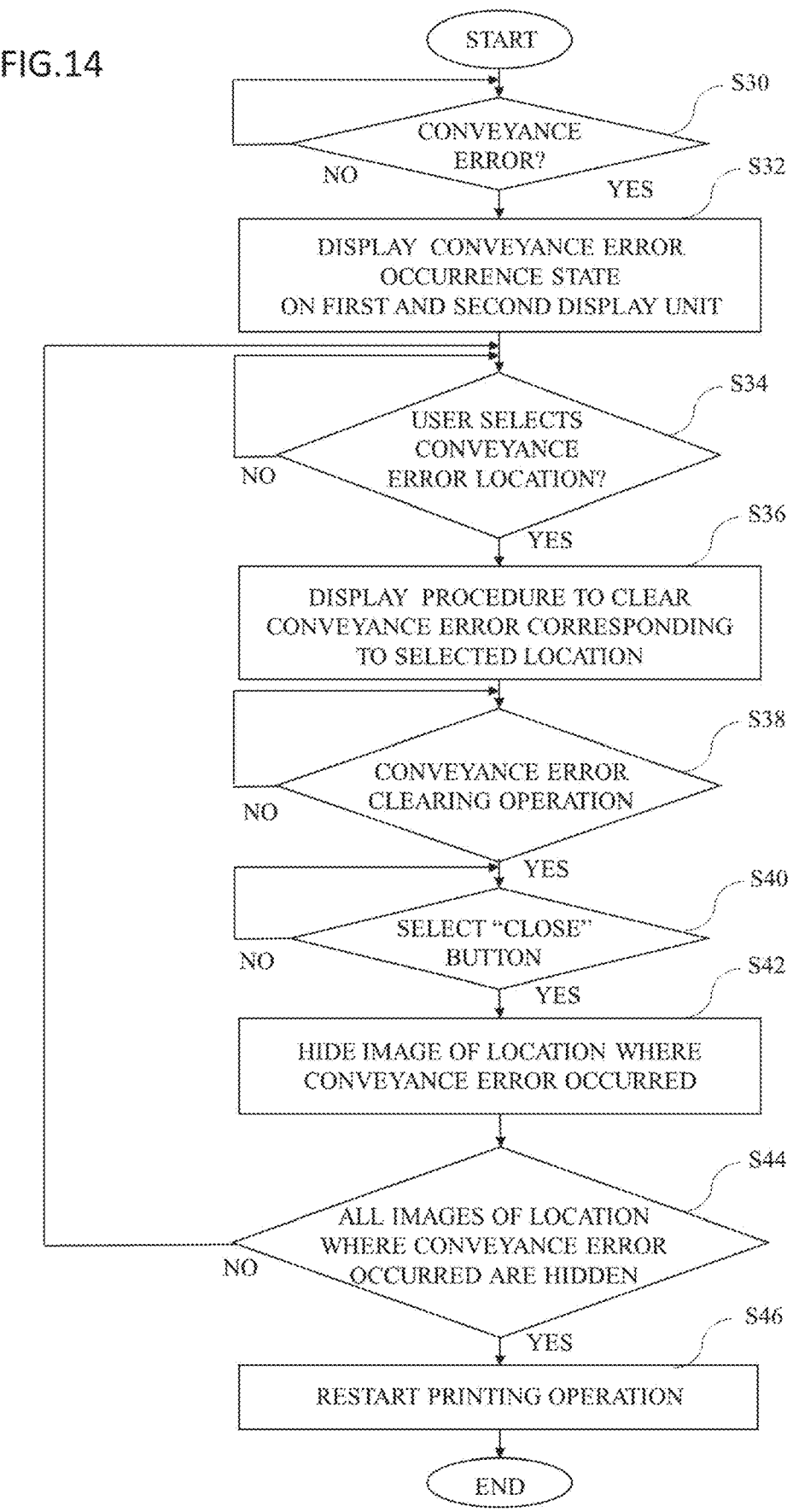
FIG. 14 is a flow chart for explaining the flow of processes in the case that a conveyance error occurs in the printing system of the second embodiment.

Next, a process which is administered in the case that a conveyance error occurs in the printing system 1 of the second embodiment will be described with reference to the flow chart illustrated in FIG. 14, and FIG. 15 and FIG. 16. Note that here, a case in which a conveyance error has occurred in both the aforementioned first printing unit and the second printing unit will be described.

First, the control unit 28 of the first printing device 20 and the control unit 44 of the second printing device 40 monitor the occurrence state of the conveyance error in the first printing unit and the second printing unit (S30).

In the case that a conveyance error occurs in both the first printing unit and the second printing unit, the control unit 28 of the first printing device 20 causes the first display unit 33 to display the occurrence state of the conveyance error of the first printing unit. At the same time, the control unit 44 of the second printing device causes the second display unit 47 to display the occurrence state of the conveyance error of the second printing unit (S32).

Figure 15A:
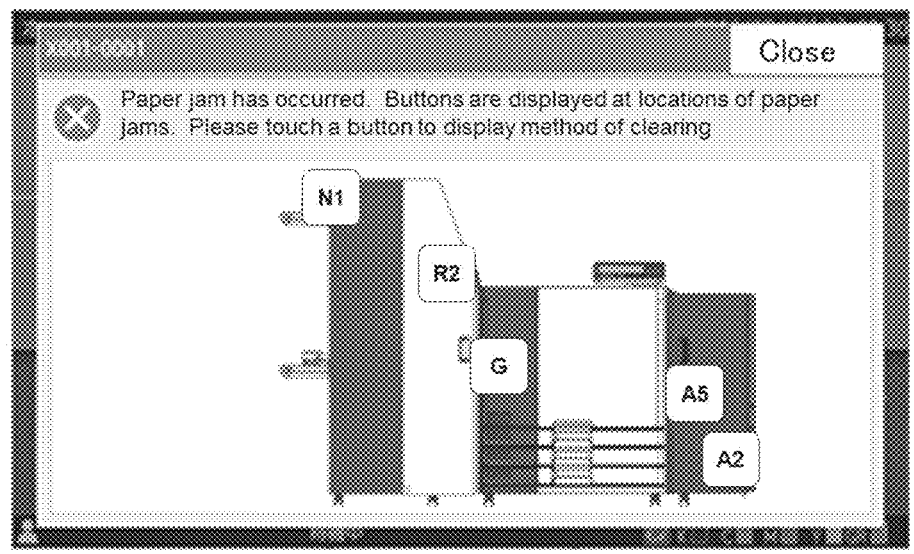
FIG. 15A is a diagram that illustrates an example of display modes of the first display unit in the case that a conveyance error occurs.
Figure 15B:
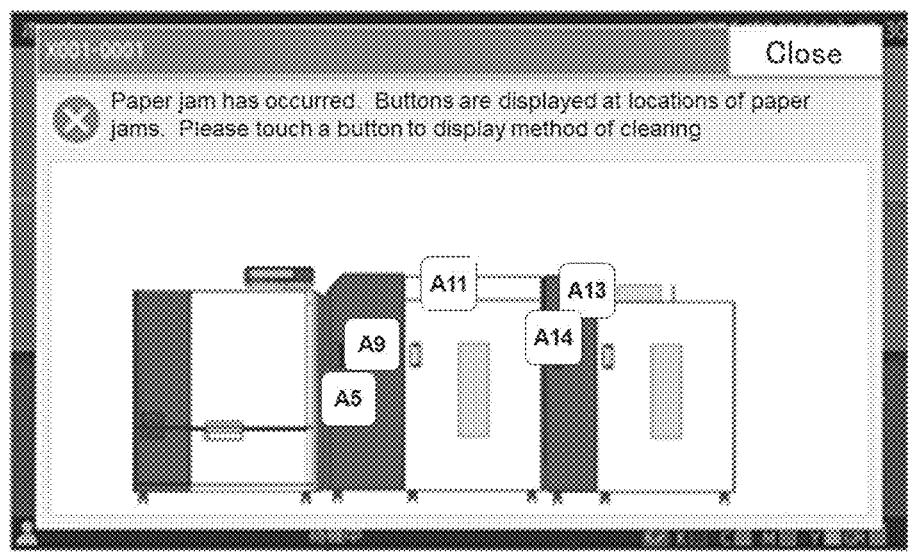
FIG. 15B is a diagram that illustrates an example of display modes of the the second display unit in the case that a conveyance error occurs.

FIG. 15A illustrates an example of a display mode of the first display unit 33, and FIG. 15B illustrates an example of a display mode of the second display unit 47. As illustrated in FIG. 15A, the first display unit 33 displays a schematic outer appearance diagram of the first printing unit (the sheet supply device 10, the first printing device 20, and the first reversing device 30), and the location at which the conveyance error has occurred on the schematic outer appearance diagram. In addition, as illustrated in FIG. 15B, the second display unit 47 displays a schematic outer appearance diagram of the second printing unit (the second printing device 40, the second reversing device 50, and the sheet discharge device 60), and the location at which the conveyance error has occurred on the schematic outer appearance diagram.

In the example which is illustrated in FIG. 15A, a rectangular image that includes the characters "N1", "R2", "G", "A5", and "A2" is displayed as an image that indicates the location where a conveyance error has occurred. "N1" and "R2" indicates the location of the conveyance error in the sheet supply device 10, "G" indicates the location of the conveyance error in the first printing device 20, and "A2" and "A5" indicate the location of the conveyance error in the first reversing device 30.

In the example which is illustrated in FIG. 15B, a rectangular image that includes the characters "A", "A9", "A11", "A13", and "A14" is displayed as an image that indicates the location where the conveyance error has occurred. "A5" and "A9" indicate the location of the conveyance error in the second reversing device 50, and "A11", "A13", and "A14" indicate the location of the conveyance error in the sheet discharge device 60.

The occurrence state of the conveyance error in the first printing unit is displayed on the first display unit 33, and at the same time, the occurrence state of the conveyance error in the second printing unit is displayed in the second display unit 47 in this manner. Therefore, it is possible to improve the visibility of the occurrence state of the conveyance errors in the entire printing system. That is, the user is enabled to immediately recognize the occurrence state of the conveyance errors, that is, whether the conveyance error is biased to the first printing unit or the second printing unit, or whether the conveyance errors are occurring in both of the first printing unit and the second printing unit. Therefore, conveyance error clearing operations can be efficiently performed.

In addition, as will be described later, even in the case that a conveyance error is occurring only in the first printing unit, for example, the first display unit 33 and the second display unit 47 display the conveyance error occurrence state of the entire printing system 1. Therefore, it is possible to immediately notify a user who is proximate the second printing unit that a conveyance error has occurred in the first printing unit.

Then, in the case that the user touches and selects one of the images that indicate the location where the conveyance error occurs as illustrated in FIG. 15A (S34), an image that illustrates a procedure for clearing the conveyance error corresponding to the selected location where the conveyance error occurs is displayed on the first display unit 33 (S36). In the case that the user touches and selects one of the images of the location where the conveyance error has occurred illustrated in FIG. 15B (S34: YES), an image that illustrates a procedure for clearing the conveyance error corresponding to the selected location where the conveyance error occurs is displayed on the second display unit 47 (S36).

Figure 16:
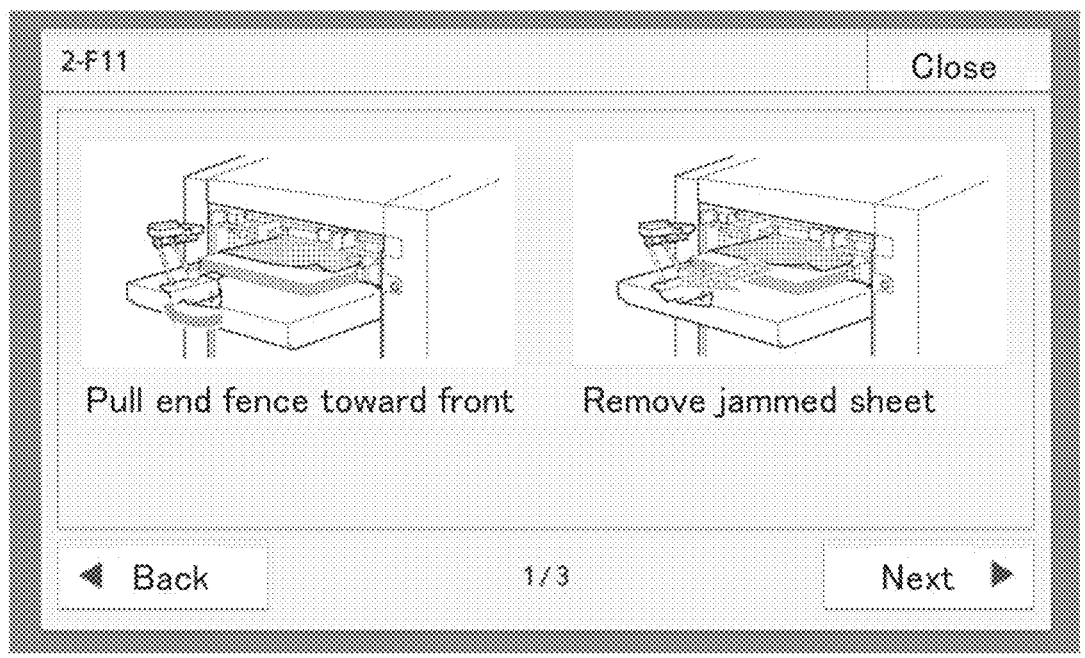
FIG. 16 is a diagram that illustrates an example of an image for providing instructions for a procedure for clearing a conveyance error.

FIG. 16 is a diagram that illustrates an example of an image of a clearing procedure which is displayed on the first display unit 33 in the case that the image of "N1" illustrated in FIG. 15A is selected by the user.

The user performs the conveyance error clearing operation while referring to the image of the clearing procedure such as that illustrated in FIG. 16. Then, in the case that the user touches the "Close" button in the upper right corner of the screen illustrated in FIG. 16 (S40: YES) after performing the clearing operation for the predetermined conveyance error occurrence location (S38: YES), the control unit 28 closes the screen illustrated in FIG. 16 and hides the image that indicates the location where the conveyance error occurred where the clearing operation was performed (S42). That is, the control unit 28 hides the image of "N" illustrated in FIG. 15A in the case that the "Close" button on the screen illustrated in FIG. 16 is touched.

Then, selection of the images of the conveyance error occurrence locations, display of the images of clearing procedures, performance of clearing operations by the user, and selection of the "Close" button are repeated until all of the images of the conveyance error occurrence locations which are displayed on the first display unit 33 and the conveyance error occurrence locations which are displayed on the second display unit 47 are hidden (S44: NO).

Figure 17A:
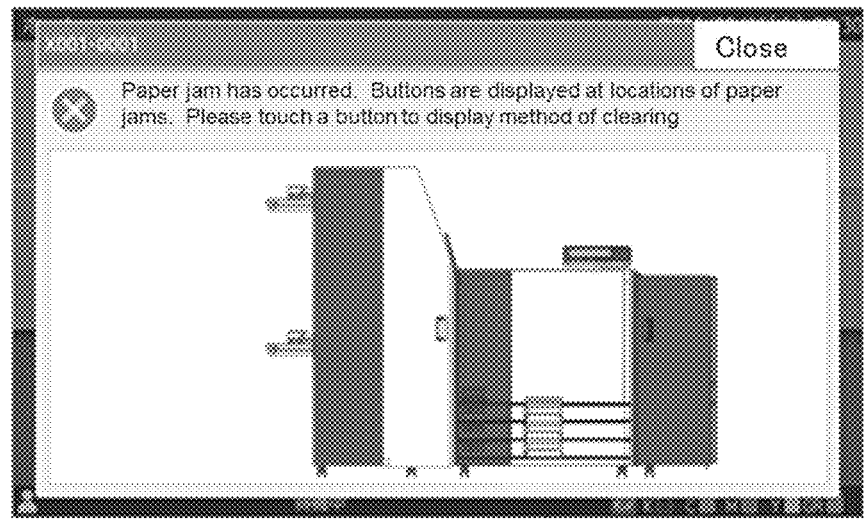
FIG. 17A is a diagram that illustrates a state in which all conveyance errors for the first printing unit have been cleared.
Figure 17B:
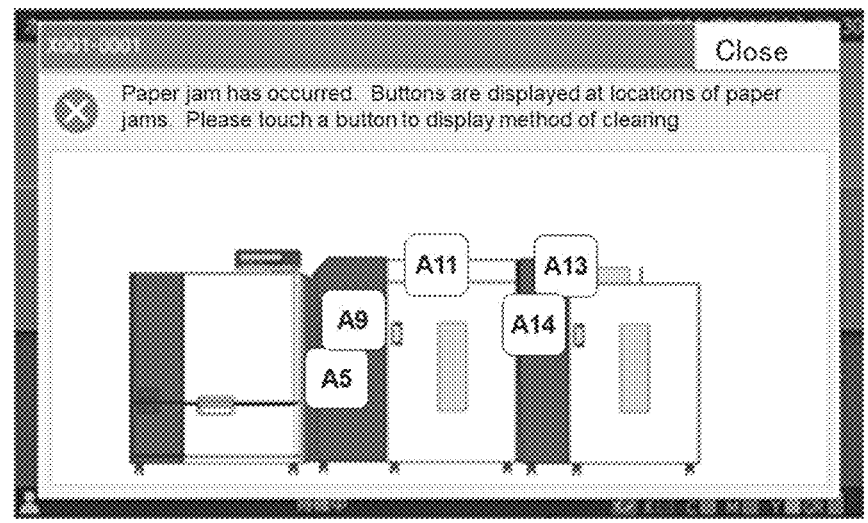
FIG. 17B is a diagram that illustrates a state in which conveyance errors for the second printing unit have not yet been cleared.

FIGS. 17A and 17B illustrate states in which all of the conveyance errors of the first printing unit have been cleared from the states which are illustrated in FIG. 15A and FIG. 15B, and the conveyance errors of the second printing unit have not yet been cleared. As illustrated in FIG. 17A, the control unit 28 of the first printing device 20 does not close the screen of the schematic outer appearance diagram of the first printing unit and displays it as it is, even if all the conveyance errors of the first printing unit are cleared, and continues to display the schematic outer appearance diagram. As a result, the user can confirm that the clearing of all of the conveyance errors has been completed for the first printing unit, and further recognize that it is necessary to perform the conveyance error clearing operations for the second printing unit as a next step.

Then, the clearing operations for the conveyance errors by the user are continuously performed, and at a point in time at which all of the images of the locations of the conveyance errors which are displayed on the first display unit 33 and the images of the locations of the conveyance error which are displayed on the second display unit 47 are hidden (S44: YES), the control unit 28 of the first printing device 20 and the control unit 44 of the second printing device 40 end the process related to the conveyance error and restart printing operations (S46).

Note that in the above description, a case in which the conveyance error occurs in both the first printing unit and the second printing unit has been described. However, in the case that conveyance errors have occurred in either one of the first printing unit and the second printing unit, the printing system 1 according to the present embodiment displays a state in which conveyance errors are not occurring on the first display unit 33 or the second display unit 47, at which no conveyance error has occurred.

Specifically, in the case that a conveyance error has occurred only in the second printing unit and no conveyance error has occurred in the first printing unit, for example, the control unit 44 of the second printing device 40 outputs a signal to the control unit 28 of the first printing device 20 that indicates that the conveyance error has occurred in the second printing unit. When the control unit 28 of the first printing device 20 receives the aforementioned signal, no conveyance error has occurred in the first printing unit. Therefore, the control unit 28 of the first printing unit 20 causes the first display unit 33 to display a state that conveyance errors are not occurring. For example, only the schematic outer appearance diagram of the first printing unit is displayed on the first display unit 33, as illustrated in FIG. 17A. The display of the conveyance error on the second display unit 47 at this time is the same as that described above.

In addition, conversely to the example described above, in the case that the conveyance error has occurred only in the first printing unit and no conveyance error has occurred in the second printing unit, the control unit 28 of the first printing device 20 outputs a signal to the control unit 44 of the second printing device 40 that indicates that the conveyance error has occurred in the first printing unit. When the control unit 44 of the first printing device 40 receives the aforementioned signal, no conveyance error has occurred in the second printing unit. Therefore, the control unit 44 of the first printing unit 40 causes the second display unit 47 to display a state that conveyance errors are not occurring.

By displaying the state in which the conveyance error has not occurred on the first display unit 33 or the second display unit 47 at the side in which the conveyance error has not occurred in this manner, it is possible for the user to recognize that the conveyance error is unevenly distributed in the first printing unit or the second printing unit within the entirety of the printing system 1. By expediently performing the conveyance error clearing operation for the first printing unit or the second printing unit, work efficiency can be improved.

In addition, with respect to the conveyance error, by displaying the locations of conveyance errors while constantly displaying entirety of the printing system 1 that includes the first printing unit and the second printing unit, whether the conveyance errors are unevenly distributed in one of the printing units or are occurring in the printing system 1 as a whole can be understood. Thereby, in a case in which uneven distributions of conveyance errors in the first printing device 20 are repeated, it can be recognized by the user that maintenance operations for the first printing device 20 are required even before a predetermined maintenance period.

Figure 18:
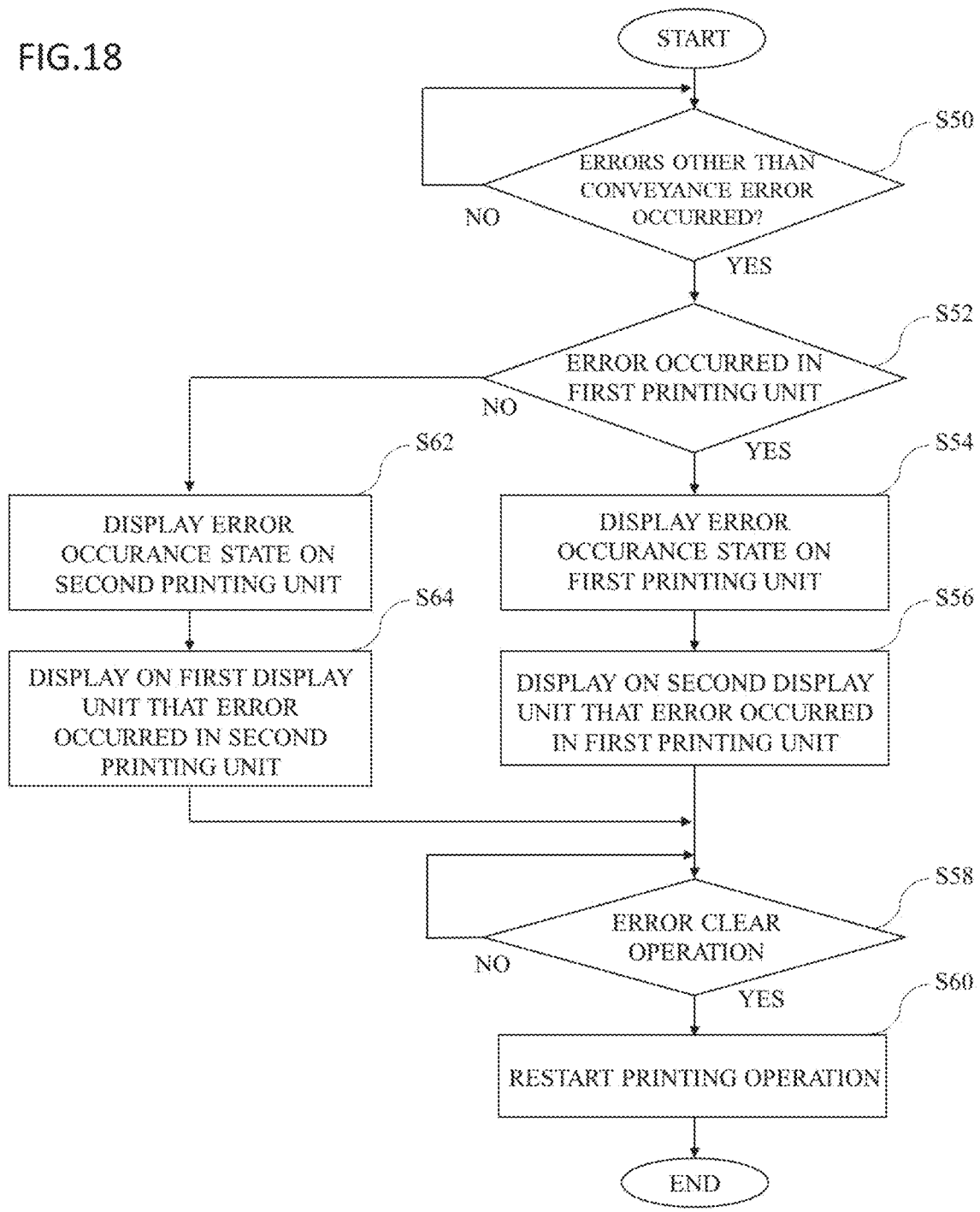
FIG. 18 is a flow chart for explaining the flow of processes in the case that an error other than a conveyance error occurs in the printing system of the second embodiment.

Next, a process which is administered in the case that an error other than the conveyance error occurs in the printing system 1 of the second embodiment will be described with reference to the flow chart illustrated in FIG. 18 and FIG. 19.

First, the control unit 28 of the first printing device 20 and the control unit 44 of the second printing device 40 monitor the occurrence state of errors other than the conveyance error in the first printing unit and the second printing unit (S50).

Then, in the case that an error has occurred in the first printing unit (S50, YES, S52, YES), for example, the control unit 28 of the first printing device 20 causes the first display unit 33 to display an error occurrence state (S54). Further, a signal that indicates that the error has occurred in the first printing unit is output to the control unit 44 of the second printing device 40.

In the case that the control unit 44 of the second printing device 40 receives the signal indicating that the error has occurred, the control unit 44 causes the second display unit 47 to display a screen that indicates that the error has occurred in the first printing unit (S56).

Figure 19A:
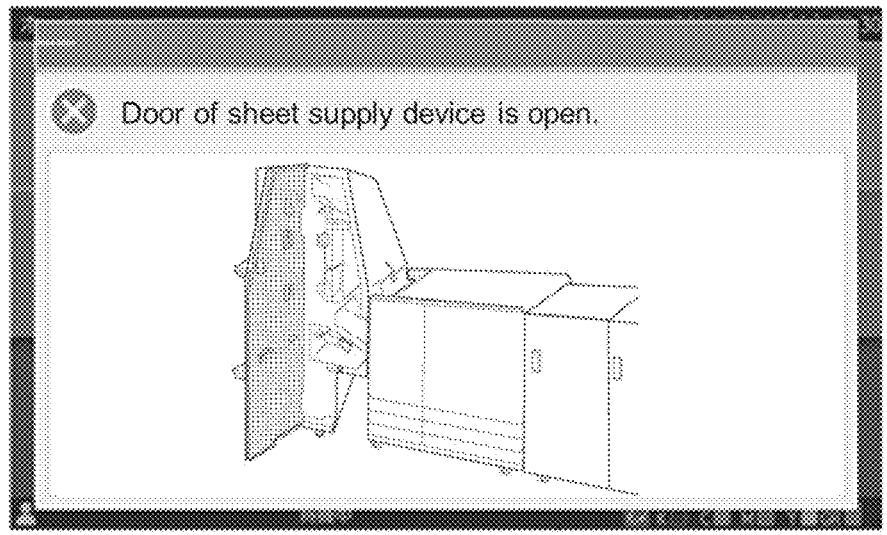
FIG. 19A is a diagram that illustrates an example of a display mode of the first display unit in the case that a door opening/closing error occurs in a sheet supply device of the first printing unit.
Figure 19B:
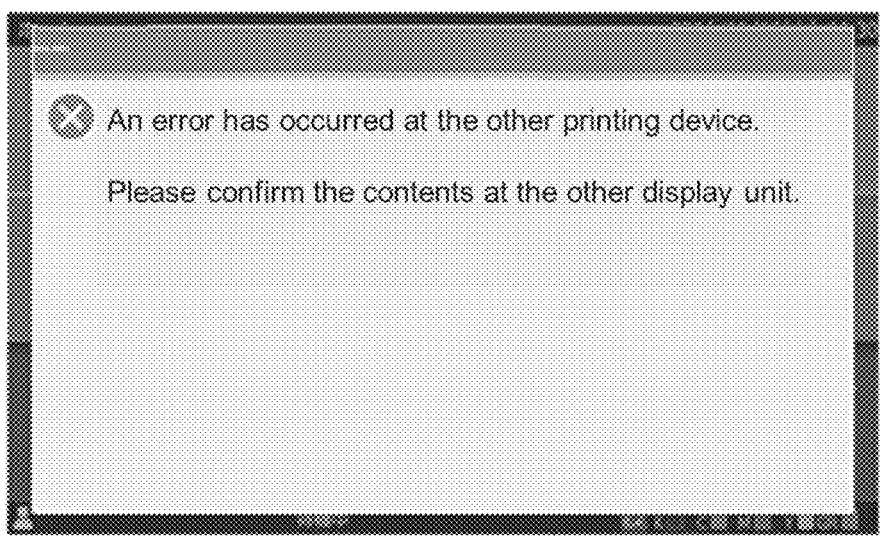
FIG. 19B is a diagram that illustrates an example of a display mode of the the second display unit in the case that a door opening/closing error occurs in a sheet supply device of the first printing unit.

FIG. 19A illustrates an example of a display mode of the first display unit 33 in the case that a door opening/closing error has occurred in the sheet supply device 10 of the first printing unit, and FIG. 19B illustrates a display mode of the second display unit 47. As illustrated in FIG. 19A, the first display unit 33 displays a message that notifies the user that the front door of the sheet supply device 10 is open and a schematic outer appearance diagram. Meanwhile, as illustrated in FIG. 19B, the second display unit 47 displays a message notifying that an error has occurred in the first printing unit.

Then, in the case that the error is cleared by the user (S58), the control unit 28 of the first printing device 20 and the control unit 44 of the second printing device 40 closes the screens such as those which are illustrated in FIG. 19A and FIG. 19B, and cause the display of the first display unit 33 and the second display unit 47 to transition to the state before the error occurred. Specifically, for example, the home screens are displayed on the first display unit 33 and the second display unit 47, respectively.

Then, the control unit 28 of the first printing device 20 and the control unit 44 of the second printing device 40 end the process related to the error and restart printing operations (S60).

On the other hand, in the case that an error has occurred in the second printing unit (S50: YES, S52: NO), the control unit 44 of the second printing device 40 causes the second display unit 47 to display an error occurrence state (S62). In addition, a signal indicating that the error has occurred in the second printing unit is output to the control unit 28 of the first printing device 20.

In the case that the control unit 28 of the first printing device 20 receives the signal indicating that the error has occurred, the control unit 28 causes the first display unit 33 to display a screen indicating that the error has occurred in the first printing unit. (S64).

In the case that the error is cleared by the user (S58), the control unit 28 of the first printing device 20 and the control unit 44 of the second printing device 40 cause the first display unit 33 and the second display unit 47 to transition the displays thereof to the state before the error occurred. Specifically, for example, the home screens are displayed on the first display unit 33 and the second display unit 47, respectively.

Then, the control unit 28 of the first printing device 20 and the control unit 44 of the second printing device 40 end the process related to the error and restart the printing operation (S60).

In the case that an error other than the conveyance error occurs in one of the first printing unit and the second printing unit as described above, the occurrence state of the error is caused to be displayed on the first display unit 33 or the second display unit 47 at the side at which the error has occurred. In addition, the other of the display unit 33 or second display unit 47 is caused to notify the user that an error has occurred in the first printing unit or the second printing unit. In such a case, even if the user is near the first printing unit or the second printing unit at which no error has occurred, for example, the user can immediately recognize the occurrence of the error, and immediate clearing of the error can be performed.

Further, in the printing system 1 of the embodiment described above, in the case that conveyance errors occur, the first display unit 33 displays the occurrence state of the conveyance error in the first printing unit, and at the same time, the second display unit 47 displays the occurrence status of the conveyance error in the second printing unit. Thereafter, however, display of the occurrence state of the conveyance error is continued at one of the first printing unit and the second printing unit even while the conveyance error is being cleared at the other printing unit.

However, the present invention is not limited to such a configuration. A configuration may be adopted, in which after the occurrence state of the conveyance error is displayed on the first display unit 33 and the second display unit 47, a screen for receiving input of settings for items which are not related to the input item of the conveyance error may be displayed on one of the first printing unit and the second printing unit while the conveyance error is being cleared at the other of the first printing unit and the second printing unit. Examples of such items may be items for setting the same contents in the first printing unit and the second printing unit, or items which are uniquely set for the first printing unit and the second printing unit.

In addition, in the case that an error other than the conveyance error occurs as well, a screen for receiving input of settings for items which are not related to the input item of the error other than the conveyance error may be displayed on one of the first printing unit and the second printing unit while the error is being cleared at the other of the first printing unit and the second printing unit. Examples of such errors include an ink depleted error, a sheet depleted error, a component replacement error, and other errors that require a certain amount of time to be cleared, for example.

Then, in the case that a screen for receiving input of settings for items which are not related to the conveyance error or the error other than the conveyance error is displayed on the display unit of the one other printing unit, when the conveyance error or the error other than the conveyance error is cleared in the other printing unit, the control unit of the other printing unit sends a signal to the control unit of the one printing unit to provide notification of this fact.

In addition, in the case that the one printing unit completes the process for an item which is not related to the conveyance error or the error other than the conveyance error, the control unit of the one printing unit sends a signal to the control unit of the other printing unit to provide notification of this fact. Such an exchange of signals between the control units is managed by either one of the control units or other control units. The displays of the first display unit 33 and the second display unit 47 may be returned to the home screen at a point in time at which clearing of the conveyance error or the error other than the conveyance error is completed, and the process for an item which is not related to the conveyance error or the error other than the conveyance error is completed.

The additional items below are also disclosed regarding the printing system of the present invention.

(Additional Items)

In the printing system of the present invention, the control unit may display all of the setting items which are set in advance on the setting input screen of one of the first display unit and the second display unit, and displays only a portion of the setting items, for which settings unique to the first printing unit or the second printing unit are to be set, from among all of the setting items, on a setting input screen of the other of the first display unit and the second display unit such that input of settings is enabled for the portion of the setting items.

In addition, in the printing system of the present invention, the control unit may display the setting input screens of the first display unit and the second display unit in a hierarchical manner, displays the same screen on the first display unit and the second display unit as a setting input screen as a first, highest hierarchical level, and displays only a portion of the setting items, for which settings unique to the first printing unit or the second printing unit are to be set, on other setting input screens of the second and subsequent hierarchical levels such that input of settings is enabled for the portion of the setting items on the first display unit and the second display unit.

In addition, in the printing system of the present invention, the control unit may cause one of the first display unit and the second display unit to display an indication that settings are being input at the other of the first display unit and the second display unit, while input of settings is being received for a setting item for which the same contents are to be set for the first printing unit and the second printing unit in a setting input screen of the other of the first display unit and the second display unit.

In addition, in the printing system of the present invention, in the case that input of settings having the same content are to be received by the first printing unit and the second printing unit, the control unit may cause the contents which have been set to be displayed on both of the first display unit and the second display unit after input of settings having the same content is completed at one of the first display unit and the second display unit.

In addition, in the printing system of the present invention, in the case that a unique error occurs in one of the first printing unit and the second printing unit, the control unit may cause a setting item for clearing the unique error to be displayed on the first display unit or the second display unit at the side where the unique error has occurred such that input of settings is enabled, while a screen indicating that the unique error has occurred in the one of the first printing unit and the second printing unit is displayed on the first display unit or the second display unit of the other of the first printing unit and the second printing unit.

In addition, in the printing system of the present invention, in the case that input of settings having the same content is received on the setting input screen of one of the first display unit and the second display unit, the control unit may send information regarding the input settings having the same content from the first printing unit or the second printing unit at the side which has received the input of settings of the same content to the first printing unit or the second printing unit at the side which has not received the input of settings of the same content.

In the printing system of the present invention, it is preferable for the control unit sends only setting input information for setting items of the same content which have been changed and to not send setting information for setting items which have not been changed, when sending information regarding setting input for the same content from one of the first printing unit and the second printing unit which has received input of settings having the same content to the other of the first printing unit and the second printing unit which has not received input of settings having the same content.

An alternate printing system of the present invention includes a first printing unit which has a first print processing unit that performs print processing on a print medium based on first print data and a first display unit that displays an occurrence state of a conveyance error related to conveyance of the print medium, a second printing unit which has a second print processing unit which is provided on the downstream side of the first printing unit in the conveyance direction of the print medium, that performs print processing on the print medium based on second print data and a second display unit that displays an occurrence state of a conveyance error related to conveyance of the print medium, and a control unit that controls the first printing unit and the second printing unit, the control unit causing the first display unit to display a conveyance error occurrence state in the first printing unit and simultaneously causing the second display unit to display a conveyance error occurrence state in the second printing unit, in the case that a conveyance error occurs in at least one of the first printing unit and the second printing unit.

In addition, in the alternate printing system of the present invention, in the case that a conveyance error occurs in only one of the first printing unit and the second printing unit, the control unit may display a state that a conveyance error is not occurring in the first display unit or the second display unit at the side at which a conveyance error is not occurring.

In addition, in the alternate printing system of the present invention, in the case that an error other than a conveyance error occurs in one of the first printing unit and the second printing unit, the control unit may cause one of the first display unit and the second display unit to display an error occurrence state and to notify the other of the first display unit and the second display unit that an error has occurred in the one of the first printing unit or the second printing unit.

What is claimed is:

1. A printing system, comprising:
a first printing unit, which has a first print processing unit that performs print processing on a print medium based on first print data and a first display unit that displays a setting input screen that receives a predetermined input of settings by a user;
a second printing unit, which is provided on the downstream side of the first print unit in a conveyance direction of the print medium, has a second print processing unit that performs print processing on the print medium based on second print data, and has a second display unit that displays a setting input screen that receives a predetermined input of settings by the user; and
a control unit that controls the first printing unit and the second printing unit;
the control unit enabling a setting to be input via the setting input screen of only one of the first display unit and the second display unit in the case that input of settings having the same content are to be received by the first printing unit and the second printing unit.

2. The printing system as defined in claim 1, wherein:
the control unit displays all of the setting items which are set in advance on the setting input screen of one of the first display unit and the second display unit, and displays only a portion of the setting items, for which settings unique to the first printing unit or the second printing unit are to be set, from among all of the setting items, on a setting input screen of the other of the first display unit and the second display unit such that input of settings is enabled for the portion of the setting items.

3. The printing system as defined in claim 2, wherein:
the control unit displays the setting input screens of the first display unit and the second display unit in a hierarchical manner, displays the same screen on the first display unit and the second display unit as a setting input screen as a first, highest hierarchical level, and displays only a portion of the setting items, for which settings unique to the first printing unit or the second printing unit are to be set, on other setting input screens of the second and subsequent hierarchical levels such that input of settings is enabled for the portion of the setting items on the first display unit and the second display unit.

4. The printing system as defined in claim 1, wherein:
the control unit causes one of the first display unit and the second display unit to display an indication that settings are being input at the other of the first display unit and the second display unit, while input of settings is being received for a setting item for which the same contents are to be set for the first printing unit and the second printing unit in a setting input screen of the other of the first display unit and the second display unit.

5. The printing system as defined in claim 1, wherein:
in the case that input of settings having the same content are to be received by the first printing unit and the second printing unit, the control unit causes the contents which have been set to be displayed on both of the first display unit and the second display unit after input of settings having the same content is completed at one of the first display unit and the second display unit.

6. The printing system as defined in claim 1, wherein:
in the case that a unique error occurs in one of the first printing unit and the second printing unit, the control unit causes a setting item for clearing the unique error to be displayed on the first display unit or the second display unit at the side where the unique error has occurred such that input of settings is enabled, while a screen indicating that the unique error has occurred in the one of the first printing unit and the second printing unit is displayed on the first display unit or the second display unit of the other of the first printing unit and the second printing unit.

7. The printing system as defined in claim 1, wherein:
in the case that input of settings having the same content is received on the setting input screen of one of the first display unit and the second display unit, the control unit sends information regarding the input settings having the same content from the first printing unit or the second printing unit at the side which has received the input of settings of the same content to the first printing unit or the second printing unit at the side which has not received the input of settings of the same content.

8. The printing system as defined in claim 7, wherein:
the control unit sends only setting input information for setting items of the same content which have been changed and to not send setting information for setting items which have not been changed, when sending information regarding setting input for the same content from one of the first printing unit and the second printing unit which has received input of settings having the same content to the other of the first printing unit and the second printing unit which has not received input of settings having the same content.

9. The printing system as defined in claim 1, wherein in the case that a conveyance error occurs in at least one of the first printing unit and the second printing unit, the control unit causes the first display unit to display a conveyance error occurrence state of the first printing unit, and simultaneously causes the second display unit to display a conveyance error occurrence state of the second printing unit.

10. The printing system as defined in claim 9, wherein: in the case that a conveyance error occurs in only one of the first printing unit and the second printing unit, the control unit causes the first display unit or the second display unit at the side at which a conveyance error is not occurring to display a state that a conveyance error is not occurring.

\* \* \* \* \*